United States Patent
Wang et al.

(10) Patent No.: US 11,924,481 B2
(45) Date of Patent: *Mar. 5, 2024

(54) AUTOMATED WORKFLOWS FROM MEDIA ASSET DIFFERENTIALS

(71) Applicant: Netflix, Inc., Los Gatos, CA (US)

(72) Inventors: Yadong Wang, Los Gatos, CA (US); Chih-Wei Wu, Campbell, CA (US); Kyle Tacke, Glendale, CA (US); Shilpa Jois Rao, Cupertino, CA (US); Boney Sekh, Cupertino, CA (US); Andrew Swan, Santa Clarita, CA (US); Raja Ranjan Senapati, Fremont, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,366

(22) Filed: Mar. 20, 2023

(65) Prior Publication Data
US 2023/0232055 A1 Jul. 20, 2023

Related U.S. Application Data

(63) Continuation of application No. 17/245,252, filed on Apr. 30, 2021, now Pat. No. 11,659,214.
(Continued)

(51) Int. Cl.
*H04N 21/2343* (2011.01)
*G06Q 10/0631* (2023.01)
(Continued)

(52) U.S. Cl.
CPC ... *H04N 21/2343* (2013.01); *G06Q 10/06312* (2013.01); *G11B 27/031* (2013.01);
(Continued)

(58) Field of Classification Search
CPC ......... H04N 21/2343; H04N 21/23412; H04N 21/23418; G06Q 10/06312; G06Q 10/0633; G11B 27/031; G11B 27/10
See application file for complete search history.

(56) References Cited

U.S. PATENT DOCUMENTS

| 8,837,910 B2 * | 9/2014 | Obama | G06F 16/58 |
| | | | 386/223 |
| 2010/0158391 A1 * | 6/2010 | Cunningham | H04N 21/8586 |
| | | | 382/209 |

(Continued)

*Primary Examiner* — Thai Q Tran
*Assistant Examiner* — Jose M Mesa
(74) *Attorney, Agent, or Firm* — Greenberg Traurig, LLP

(57) ABSTRACT

The disclosed computer-implemented method may include (1) accessing a first media data object and a different, second media data object that, when played back, each render temporally sequenced content, (2) comparing first temporally sequenced content represented by the first media data object with second temporally sequenced content represented by the second media data object to identify a set of common temporal subsequences between the first media data object and the second media data object, (3) identifying a set of edits relative to the set of common temporal subsequences that describe a difference between the temporally sequenced content of the first media data object and the temporally sequenced content of the second media data object, and (4) executing a workflow relating to the first media data object and/or the second media data object based on the set of edits. Various other methods, systems, and computer-readable media are also disclosed.

20 Claims, 19 Drawing Sheets

Related U.S. Application Data

(60) Provisional application No. 63/054,132, filed on Jul. 20, 2020.

(51) Int. Cl.
  *G11B 27/031* (2006.01)
  *G11B 27/10* (2006.01)
  *H04N 21/234* (2011.01)

(52) U.S. Cl.
  CPC ....... *G11B 27/10* (2013.01); *H04N 21/23412* (2013.01); *H04N 21/23418* (2013.01)

(56) References Cited

U.S. PATENT DOCUMENTS

2015/0117397 A1* 4/2015 Ofir .................. H04L 65/611
                                                                  370/331
2019/0132654 A1* 5/2019 Hu ................... H04N 21/23418

\* cited by examiner

AUTOMATED WORKFLOWS FROM MEDIA ASSET DIFFERENTIALS

CROSS REFERENCE TO RELATED APPLICATION

This application is a continuation of U.S. Non-Provisional application Ser. No. 17/245,252, filed 30 Apr. 2021 which claims the benefit of U.S. Provisional Application No. 63/054,132, filed 20 Jul. 2020, the disclosures of which are incorporated, in their entirety, by this reference.

BACKGROUND

Media production may involve various and sometimes interdependent production tasks. Accordingly, when a new cut of a media asset is provided during the production process, one or more production teams and/or computing tasks may be implicated. Unfortunately, it may be difficult and laborious for production teams to determine whether and what steps are needed when a new cut is provided, resulting in a significant amount of labor as well as the likelihood of oversights or mistakes.

SUMMARY

As will be described in greater detail below, the present disclosure describes systems and computer-implemented methods for computer-generated and -executed automated workflows from media asset differentials. One of these computer-implemented methods may include accessing a first media data object and a different, second media data object that, when played back, each render temporally sequenced content. The method may also include comparing first temporally sequenced content represented by the first media data object with second temporally sequenced content represented by the second media data object to identify a set of common temporal subsequences between the first media data object and the second media data object. The method may further include identifying a set of edits relative to the set of common temporal subsequences that describe a difference between the temporally sequenced content of the first media data object and the temporally sequenced content of the second media data object. The method may then include executing a workflow relating to at least one of the first media data object and the second media data object based on the set of edits.

In one example, comparing the first temporally sequenced content with the second temporally sequenced content may include (1) dividing the first temporally sequenced content into a first sequence of segments, (2) dividing the second temporally sequenced content into a second sequence of segments, (3) calculating a pairwise distance between each segment within the first sequence of segments and each segment within the second sequence of segments to identify one or more common segments between the first sequence and second sequence, whose pairwise distance falls within a predetermined threshold, and one or more different segments between the first sequence and second sequence, whose pairwise distance exceed the predetermined threshold, (4) identifying the longest common subsequence of segments between the first sequence of segments and the second sequence of segments, and (5) identifying the set of common temporal subsequences from the longest common subsequence of segments by identifying a set of contiguous portions of the longest temporal subsequence.

In the above example or other examples, the first and second media data objects may include audio data objects. In addition, dividing the first temporally sequenced content into the first sequence of segments may include dividing the first temporally sequenced content into segments of a predetermined length of time. Furthermore, dividing the second temporally sequenced content into a second sequence of segments may include dividing the second temporally sequenced content into segments of the predetermined length of time.

Additionally or alternatively, in the previous example or other examples, the first and second media data objects may include video data objects. In addition, dividing the first temporally sequenced content into the first sequence of segments may include dividing the first temporally sequenced content into separate video frames. Furthermore, dividing the second temporally sequenced content into a second sequence of segments may include dividing the second temporally sequenced content into separate video frames. In addition, in some examples, identifying the longest common subsequence of segments between the first sequence of segments and the second sequence of segments may include identifying the longest common subsequence of segments with a same temporal ordering in both the first sequence of segments and the second sequence of segments.

In some examples, executing the workflow may include (1) identifying a user account associated with performing a task that relates to the first media data object and (2) generating and assigning a new task to the user account based at least in part on at least one of the set of edits to the first media data object. In these or other examples, a computer-implemented method may also include (1) identifying a project that relates to the first media data object, (2) identifying a set of dependencies within the project, and (3) designating the task as incomplete based at least in part on the set of edits interfering with at least one dependency upon which the task relies.

In some examples, the workflow may include a post-production workflow for a content item that has been changed as represented by a difference between the first media data object and the second media data object. In these or other examples, the post-production workflow may include a localization workflow to update a localization of video content. The localization may include, for example, (1) dubbing the video content in a selected language, (2) subtitling the video content in a selected language, and/or (3) applying visual description to the video content.

In various examples, the workflow may include a quality control workflow for inspecting changed content of the first media data object as indicated by the set of edits. In some examples, the workflow may include transforming stored data corresponding to temporally sequenced content of the second media data object that falls outside the set of common temporal subsequences between the first media data object and the second media data object based at least in part on the set of edits.

The set of edits may include any of a variety of edits. For example, the set of edits may include (1) an insertion of content adjacent to a subsequence within the set of common temporal subsequences, (2) a deletion of content adjacent to a subsequence within the set of common temporal subsequences, and/or (3) a substitution of content adjacent to a subsequence within the set of common temporal subsequences.

In some examples, the set of edits may indicate a change in relative temporal position between a first subsequence within the set of common temporal subsequences and a second subsequence within the set of common temporal subsequences.

In some examples, comparing the first temporally sequenced content represented by the first media data object with the second temporally sequenced content represented by the second media data object may include (1) rendering the first temporally sequenced content from the first media data object and (2) rendering the second temporally sequenced content from the second media data object.

In some examples, the first media data object and the second media data object may each include simultaneous video content and audio content. In these or other examples, identifying the set of common temporal subsequences between the first media data object and the second media data object may include identifying a set of common temporal video subsequences and a set of common temporal audio subsequences. In addition, executing the workflow based on the set of edits may include determining the workflow based at least in part on determining a difference between the set of common temporal video subsequences and the set of common temporal audio subsequences.

In some examples, identifying the set of edits may include generating metadata that indicates a start time and an end time for each subsequence within the set of common temporal subsequences.

In addition, a corresponding system for computer-generated and -executed automated workflows from media asset differentials may include at least one physical processor and physical memory including computer-executable instructions that, when executed by the physical processor, cause the physical processor to (1) access a first media data object and a different, second media data object that, when played back, each render temporally sequenced content, (2) compare first temporally sequenced content represented by the first media data object with second temporally sequenced content represented by the second media data object to identify a set of common temporal subsequences between the first media data object and the second media data object, (3) identify a set of edits relative to the set of common temporal subsequences that describe a difference between the temporally sequenced content of the first media data object and the temporally sequenced content of the second media data object, and (4) execute a workflow relating to at least one of the first media data object and the second media data object based on the set of edits.

In some examples, the above-described method may be encoded as computer-readable instructions on a computer-readable medium. For example, a computer-readable medium may include one or more computer-executable instructions that, when executed by at least one processor of a computing device, may cause the computing device to (1) access a first media data object and a different, second media data object that, when played back, each render temporally sequenced content, (2) compare first temporally sequenced content represented by the first media data object with second temporally sequenced content represented by the second media data object to identify a set of common temporal subsequences between the first media data object and the second media data object, (3) identify a set of edits relative to the set of common temporal subsequences that describe a difference between the temporally sequenced content of the first media data object and the temporally sequenced content of the second media data object, and (4) execute a workflow relating to at least one of the first media data object and the second media data object based on the set of edits.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 10E1 is an illustration of the longest common subsequence identified within the pair of audio signals of FIG. 9.

FIG. 12E1 is an illustration of the longest common subsequence identified within the pair of audio signals of FIG. 11.

Figure 1:
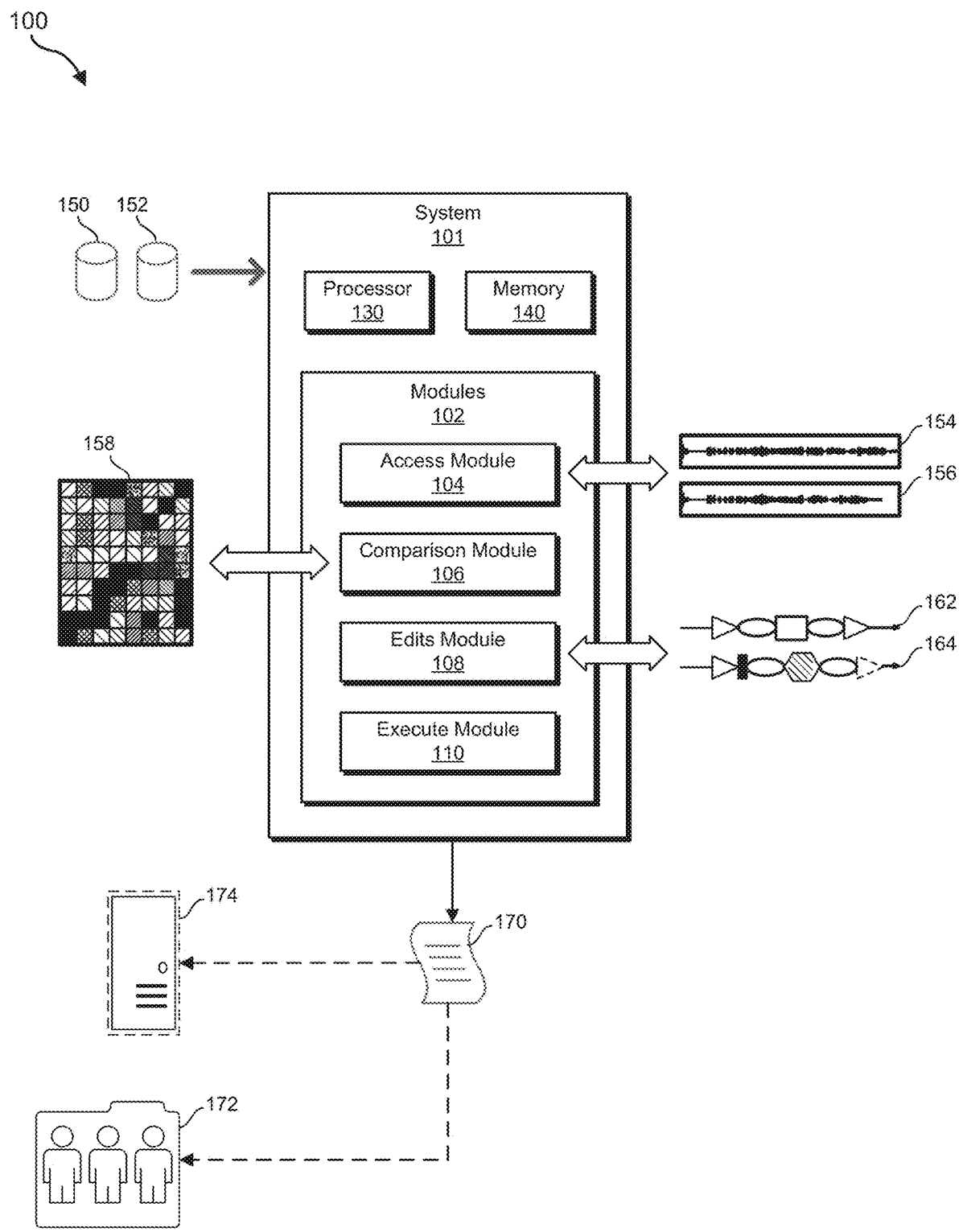
FIG. 1 is a diagram of an exemplary system for automated workflows from media asset differentials.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to systems and methods for determining temporally sequential commonalities between media assets (e.g., video and audio assets) to identify edits or changes that describe the differences between the media assets. These systems and methods may then automate the generation and/or execution of workflows based on the identified edits or changes.

Draft media assets may be shared by multiple independent pre-production, production, and post-production teams. By executing workflows based on edits or changes that describe differences between media assets, especially media assets that are shared by multiple independent teams that each perform a different function in the pre-production/production/post-production of the media assets, the systems and methods described herein may notify teams of, e.g., added materials that need to be handled and/or removed materials that can be forgotten. When changes to a media asset are detected, workflows and/or notifications may automatically be triggered without the need for a full review by a team of the media assets. For example, if a media asset is modified/updated by a production team, various workflows and/or notifications may be automatically triggered for post-production teams that enable the post-production teams to quickly focus their attention on material modifications. Additionally or alternatively, workflows that prepare computing resources for teams to work on a task may execute in advance of the team starting work. In some examples, workflows may automate one or more production or post-production tasks based on identified edits. Merging of two versions of a media asset may also be enabled such that different teams can make simultaneous modifications to a master media asset.

One method for determining modifications between two versions of the same media asset may involve the detection of common subsequences shared by both media assets. A suitable longest audio common subsequence (LACS) algorithm or longest video common subsequence (LVCS) algorithm may be used to identify common subsequences. By mapping common subsequences shared by media assets, additions, deletions, substitutions, changes to order, etc. may be determined. Various features may be used when comparing the individual subsequences within two media assets. In some examples, for audio assets, spectrograms (e.g., log-mel spectrograms) may be used. In some examples, for video assets, reduced-resolution frames may be used. Comparisons may be computed using a suitable distance function (e.g., a standardized Euclidian distance or a mean squared error (MSE)). Once a pairwise comparison matrix that includes comparisons of the individual subsequences in two media assets has been computed, an optimal path may be read from the table that indicates the longest common subsequences shared by the media assets and/or indications of differences between the media assets.

As will be explained in greater detail below, embodiments of the present disclosure may improve the functioning of a computer by improving the semantic organization of media assets stored, accessed, handled, processed, and/or shared by the computer. In addition, in some examples these embodiments may improve the functioning of a computer by enabling the computer to perform tasks in advance of operator input and/or in anticipation of operator requirements. Furthermore, embodiments of the present disclosure may improve the field of computer-assisted digital media production by reducing the time and labor spent on reviewing media assets, reducing potential oversights and errors made by pre-production, production, and post-production teams, improving the organization of human- and computer-based media production processes, and/or providing tools for automating aspects of media production. The various embodiments mentioned above and additional embodiments will be described in greater detail below with regard to computing environment 100 of FIG. 1, computer-implemented method 200 of FIG. 2, and the embodiments depicted in FIGS. 3-19.

FIG. 1 illustrates a computing environment 100 that includes a computer system 101. The computer system 101 includes software modules, embedded hardware components such as processors, or a combination of hardware and software. The computer system 101 is substantially any type of computing system including a local computing system or a distributed (e.g., cloud) computing system. In some cases, the computer system 101 includes at least one processor 130 and at least some system memory 140. The computer system 101 includes program modules 102 for performing a variety of different functions. The program modules are hardware-based, software-based, or include a combination of hardware and software. Each program module uses computing hardware and/or software to perform specified functions, including those described herein below.

System 101 may include an access module 104 that is configured to access media data objects (e.g., audio files, video files, etc.). The media data objects may be stored in any suitable form, including as one or more files within a file system, one or more database objects within a database, etc. By way of example, access module 104 may access media data objects 150 and 152. For example, media data object 150 may represent a video file and media data object 152 may represent another video file that was derived from media data object 150 and/or derived from a source shared with media data object 152 (e.g., media data object 152 may represent an alternate and/or updated cut of media data object 150). In some examples, access module 104 may access content (e.g., rendered content and/or content features) from media data objects 150 and 152 in the form of content 154 and 156, respectively.

System 101 also may include a comparison module 106 that compares content represented by media data object 150 with content represented by media data object 152. Comparison module 106 may thereby identify a set of common temporal subsequences between media data objects 150 and 152. In one example, comparison module 106 may divide the content of media data objects 150 and 152 into segments and perform a pairwise comparison of each of the segments of media data object 150 with each of the segments of media data object 152. Comparison module 106 may thereby produce a temporally ordered matrix of the pairwise comparisons, such as a matrix 158, and determine a path that identifies the longest common subsequence between the respective sets of segments. The common temporal subsequences may represent subsequences within the longest common subsequence that are temporally contiguous in the content of both media data objects 150 and 152.

System 101 may additionally include an edits module 108 that identifies a set of edits relative to the set of common temporal subsequences that describe a difference between the content of the media data object 150 and the content of media data object 152. The edits may describe such edits as additions, deletions, substitutions, and/or swaps of content (corresponding to subsequences of segments) that, if applied to media data object 150, would produce media data object 152. For example, the ordered set of subsequences 162, representing the content of media data object 150, may, with an addition, a substitution, and a deletion result in the ordered set of subsequences 164 that corresponds to media data object 152.

System 101 may further include an execute module 110 that executes one or more workflows (e.g., a workflow 170) relating to media data object 150 and/or media data object 152 based on the set of edits identified by edits module 108. For example, execute module 110 may generate and send one or more notifications to a team 172 that defines a task for team 172 to perform and/or that describes one or more of the edits identified by edits module 108. Additionally or alternatively, execute module 110 may generate instructions for one or more computer-executable tasks and provide the instructions to a computing system 174 to perform. These embodiments are described in greater detail below with respect to computer-implemented method 200 of FIG. 2.

Figure 2:
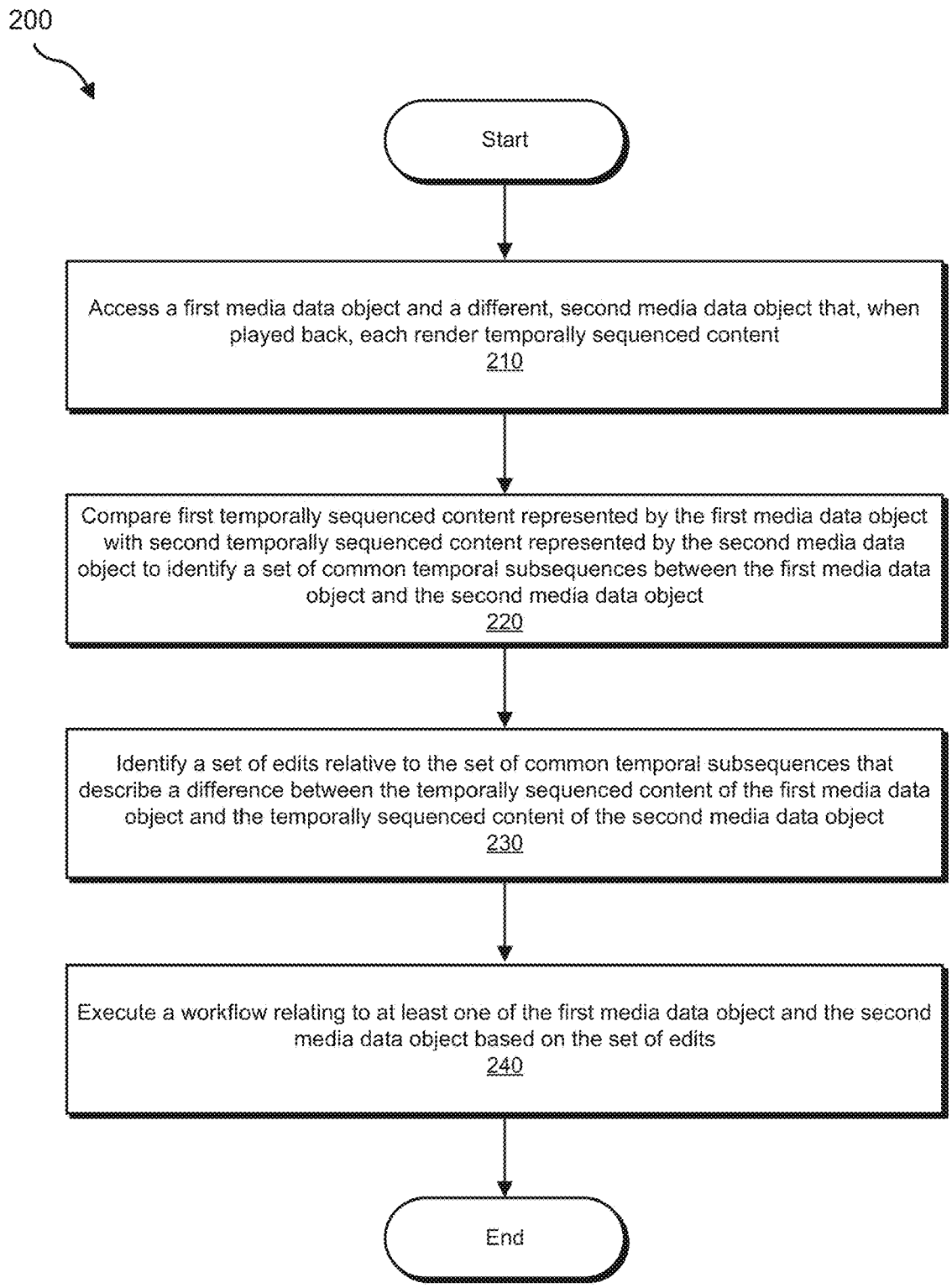
FIG. 2 is a flow diagram of an exemplary method for automated workflows from media asset differentials.

FIG. 2 is a flow diagram of an exemplary computer-implemented method for automated workflows from media asset differentials. The steps shown in FIG. 2 are performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210, method 200 may include accessing a first media data object and a different, second media data object that, when played back, each render temporally sequenced content. As used herein, the term "data object" may refer to any type or form of data that may be digitally stored, accessed, and/or transformed. For example, a data object may include a file, a set of files, a database entry, a set of database entries, and/or a collection of data stored across any of a number of locations according to a defined format or schema. Likewise, the term "media data object" may refer to any data object that represents a media asset or item. Examples of media assets include audio, video, or combined audio and video.

As used herein, the term "temporally sequenced content" may refer to any content designed to be presented over a period of time (e.g., audio content and/or video content).

Accessing the media data objects may happen in any of a variety of contexts. For example, the first media data object may be stored in a repository related to a media production project. The second media data object may later be uploaded to the repository—and, e.g., may be marked as an updated version of the first media data object. Accordingly, systems described herein may monitor the repository for updates relating to the first media data object and thereby also identify the second media data object. In some examples, the first and second media data objects may simply be submitted by a user to systems described herein as two versions of a media asset. In some examples, systems described herein may monitor for updates to the first media data object based on using as input a computer-readable production project specification that identifies the first media data object as involved in one or more production tasks (e.g., being performed and/or to be performed by one or more production teams and/or one or more computing systems).

In some examples, accessing the first and second media data objects may include identifying storage locations of the first and second media data objects and/or loading the first and second media data objects into memory. In some examples, accessing the first and second media data objects may include decoding, interpreting, and/or rendering the first and second media data objects to access content represented by the first and second media data objects. It may be appreciated that it is conceptually possible that the binary content of two media data objects could be completely different while the rendered content of the two media data objects could be nearly perceptually identical; or, conversely, that the stored binary data of two media data objects could be nearly identical while the rendered content of the two media data objects could be perceptually vastly different. Where comparing media data objects is discussed herein, generally the discussion relates to comparing the content as it would be rendered and temporally sequenced rather than comparing the stored binary data (as it would be sequentially stored).

Furthermore, in some examples, systems described herein may pre-process the first and second media data objects and/or extract one or more features from the first and second media data objects. In some examples, as will be described in greater detail below, these systems may divide the content of the media data objects into segments (e.g., of equal temporal length). Thus, for example, these systems may divide audio content into segments of a specified length (e.g., 4 seconds, 2 seconds, etc.). Likewise, these systems may divide video content into segments, each segment corresponding to one frame of video.

As another example of pre-processing, systems described herein may downsample audio content to a specified sampling frequency (e.g., 16000 Hz, 12000 Hz, 8000 Hz, etc.). This may have the benefit of reducing computational load and improving efficiency while preserving human-salient differences. These systems may extract features from the audio content useful for comparing the similarity of the content. For example, these systems may convert the content to spectrograms. In some examples, these systems may convert the content into log-mel spectrograms. For example, these systems may extract 128 mel frequencies, thereby producing 128-dimensional log-mel features.

Similarly, systems described herein may downsample video content to a specified resolution (e.g., 320×180). Furthermore, these systems may crop video content to achieve a consistent size and/or aspect ratio. In some examples, these systems may also apply cropping to each frame to remove potentially irrelevant content. For example, these systems may crop approximately 2% of the horizontal portion of the frame and approximately 15% of the vertical portion of the frame to remove potentially irrelevant textual content. In addition, these systems may reformat the content as a vector (e.g., converting the downsampled 320×180 frame to a 57600×1 vector).

It may be appreciated that pre-processing steps, including downsampling, feature extraction, etc. may reduce the precision of comparisons of media content to some degree. This may provide a benefit, as the systems described herein may identify content that is substantially the same while disregarding negligible differences (e.g., such as differences that may arise during separate encoding processes rather than differences that may arise due to human-originating edits to content). As will be described in greater detail below, systems described herein may compare the media content according to parameters that provide a meaningful degree of precision.

Method 200, at step 220, next includes comparing first temporally sequenced content represented by the first media data object with second temporally sequenced content represented by the second media data object to identify a set of common temporal subsequences between the first media data object and the second media data object.

As mentioned above, systems described herein may compare the first and second temporally sequenced content by comparing segments of the first and second temporally sequenced content. For example, these systems may divide the first temporally sequenced content into a first sequence of segments and may divide the second temporally sequenced content into a second sequence of segments.

Once the temporally sequenced content of the first and second media data objects has been divided into the respective first and second sequences of segments, systems described herein may calculate a pairwise distance between each segment within the first sequence of segments and each segment within the second sequence of segments to identify one or more common segments between the first sequence and second sequence, whose pairwise distance falls within a predetermined threshold, and one or more different segments between the first sequence and second sequence, whose pairwise distance exceed the predetermined threshold. Thus, these systems may classify each pair of segments across the sequences as either common (e.g., substantially the same) or different (e.g., not substantially the same). As used herein, "calculating the pairwise distance" may refer to any procedure for comparing each pair of segments to classify them as being in common or different from each other. Thus, in some examples a heuristic may be used in place of calculating the pairwise distance to completion. For example, in the course of performing operations suitable for calculating the pairwise distance between two segments of content, systems described herein may apply a heuristic that indicates that, given the computations that have already been performed it is definite (or, e.g., likely) that the pairwise distance will (or will not) fall within the predetermined threshold. Thus, these systems may halt further calculation of the pairwise distance.

Systems described herein may use any suitable approach for calculating the pairwise distance between each segment within the first sequence and each segment within the second sequence. For example, these systems may calculate a Euclidean distance between feature vectors that represent the content.

Taking the case of audio content as an example, the systems described herein may compute the standardized Euclidean distance between each pair of the audio segments (across the first and second media objects), as shown in Equation (1):

$$\sqrt{\Sigma(u_i - v_i)^2 / V[x_i]}. \quad (1)$$

where u and v are the respective vectors representing a segment from the first and second media objects, respectively (e.g., 128-dimensional log-mel features, as described earlier); V is a variance vector, V[i] being the variance computed over all of the ith components of the log-mel vector.

Taking the case of video content as an example, the systems described herein may compute the structural similarity index measure for each pair of video frames (across the first and second media objects. Generally, the systems described herein may use any suitable similarity metric, including, e.g., the mean squared error.

As mentioned earlier, the systems described herein may determine which segments pairs are substantially the same and which are not, and so classify each pair. Thus, for example, the systems described herein may apply each computed pairwise distance to a predetermined distance threshold to determine whether each given pair is the same or different. After having performed a pairwise comparison of each of the segments from the first media data object with each of the segments from the second media data object and classified each pair as the same or different, in some examples the systems described herein may determine the longest common subsequence between the first and second set of segments.

As may be appreciated, the longest common subsequence may not be a contiguous sequence of segments within the first sequence of segments or within the second sequence of segments. Accordingly, the systems described herein may identify each contiguous subsequence of common segments (i.e., each subsequence of common segments that is contiguous in both the first and second sequence of segments) in the process of determining the longest common (but non-contiguous) subsequence. In this manner, the systems described herein may identify the set of common (contiguous) temporal subsequences between the first media data object and the second media data object. As will be explained in greater detail below, systems described herein may treat each such contiguous subsequence as a token within a temporal string of tokens—a string to which edit operations could be applied (e.g., adding, deleting, and/or replacing tokens—i.e., contiguous subsequences of segments) to describe differences between the content of the first and second media data objects. In addition, systems described herein may identify, within the first and/or the second sequence, contiguous subsequences of (differing) segments before, after, or in between contiguous subsequences of common segments. These systems may also treat these contiguous subsequences of differing segments as tokens within the temporal string of tokens for the respective first and second media data objects (representing, e.g., tokens removed from or replaced within the first media data object and/or tokens added to or replaced within the second media data object).

Method 200, at step 230, next includes identifying a set of edits relative to the set of common temporal subsequences that describe a difference between the temporally sequenced content of the first media data object and the temporally sequenced content of the second media data object. The systems described herein may identify the set of edits in any suitable manner. For example, these systems may take as input strings (one representing the first media data object and one representing the second media data object) composed of contiguous subsequences of segments (either common subsequences or subsequences of differing segments) and identify a series of edits that would transform the string representing the first media data object into the string representing the second media data object. Thus, in these examples, the systems described herein may apply any algorithm for determining an edit distance between two strings (e.g., Levenshtein distance) and identify the set of edits as those that produce the edit distance (e.g., the minimum required edits to transform one string to the other). The edits used to define the set of edits may include any suitable combination of potential edits. For example, available edits may include addition and deletion; addition, deletion, and substitution; addition, deletion, substitution, and swapping adjacent units; etc.

In some examples, the set of edits may indicate a change in relative temporal position between a first subsequence within the set of common temporal subsequences and a second subsequence within the set of common temporal subsequences. For example, an insertion of content may place two common temporal subsequences further apart than before. Likewise, a deletion of content may result in two common temporal subsequences being nearer together than before.

Method 200, at step 240, next includes executing a workflow relating to the first media data object and/or the second media data object based on the set of edits. The workflow may include any of a variety of computer-executable steps. For example, the workflow may include generating and/or sending a notification describing and/or indicating the set of edits (e.g., as representing differences between the first media data object and the second media data object). For example, the systems described herein may identify a user account associated with performing a task that is based at least in part on the first media data object. These systems may then send a notification to the user account that indicates at least one of the set of edits to the first media data object.

In some examples, the workflow may include generating and/or sending a task assignment (e.g., to a user account and/or to a production team) that is based on the set of edits. For example, the systems described herein may take as input a team specification data object that specifies one or more teams and/or team members that work on a project including the first media data object. A change to the first media data object may imply that a team is to redo a task for the project that had involved the first media data object and/or to revise work done on the project that had involved the first media data object. Accordingly, these systems may execute a workflow that includes sending a task assignment to a team to perform the task using content from the second media data object.

In some examples the systems described herein may generate and/or execute the workflow by taking as input information about a larger project. For example, these systems may identify a project that relates to the first media data object. These systems may also identify a set of dependencies within the project. Accordingly, these systems may designate the task as incomplete based at least in part on the set of edits interfering with at least one dependency upon which the task relies. It may be appreciated that some edits may implicate some tasks while not implicating other tasks, based on different dependencies. For example, a task to add special effects to content may not be triggered by the removal of content. However, a task to edit subtitles may be triggered by the removal of content (because, e.g., of the possibility of superfluous subtitles representing removed content remaining).

In some examples, the systems described herein may, in the course of executing the workflow, identify relevant portions of the second media data object to one or more teams that had worked on tasks involving the first media data object. For example, these systems may identify added portions, removed portions, and/or substituted portions of the temporally sequenced content renderable by the second media data object. To this end, in some examples these systems may provide timestamps (e.g., a start time and an end time for each subsequence within the set of common temporal subsequences) and/or other indicators of the temporal location of the relevant portions of the second media data object. Additionally or alternatively, these systems may extract, bookmark, and/or highlight the relevant portions of the second media data object.

The systems described herein may execute any of a variety of types of workflows. For example, the workflow may include a post-production workflow for a content item that has been changed as represented by a difference between the first media data object and the second media data object. In some examples, the post-production workflow may include a localization workflow to update a localization of video content. The localization may include any of a variety of tasks. For example, the localization may include dubbing the video content in a selected language, subtitling the video content in a selected language, and/or applying visual description to the video content. Thus, for example, if the set of edits includes an addition of new content, the workflow may include adding new dubbing, subtitling, and/or visual description for the new content. If, for example, the set of edits includes a deletion of the content, the workflow may include removing portions of dubbing, subtitling, and/or visual description that no longer correspond to content. Additionally or alternatively, the workflow may include marking a previous task as completed or unnecessary when the content that it is associated with is identified as deleted.

In some examples, the systems described herein may identify (e.g., based on a specification for each team and each type of edit) what task or tasks are to be performed (and, e.g., relating to which portions of the content of the first and/or second media data objects).

In some examples, the workflow may include a quality control workflow for inspecting changed portions of the content item as indicated by the set of edits. For example, the workflow may include a notification and/or task assignment to perform a continuity check relating to a portion of content being inserted, deleted, and/or swapped with a temporally adjacent portion of content.

In some examples, the first media data object and the second media data object may each include simultaneous video content and audio content. In these examples, identifying the set of common temporal subsequences between the first media data object and the second media data object may include identifying both a set of common temporal video subsequences and a set of common temporal audio subsequences. Thus, in these examples, executing the workflow based on the set of edits may include determining the workflow based at least in part on determining a difference between the set of common temporal video subsequences and the set of common temporal audio subsequences. For example, if there is a discrepancy between the set of common temporal video subsequences and the set of common temporal audio subsequences (such that video changed where audio did not), systems described herein may determine that a scene involving the common subsequences is the same as before but the scene has been visually updated with new shots. Thus, these systems may execute a workflow based around adding new visual descriptions but not changing subtitles. In another example, where audio changed but video did not, these systems may execute a workflow based around adding new subtitles but not changing visual descriptions.

In some examples, a workflow may trigger transformation of stored data (e.g., stored media data). For example, the workflow may include transforming stored data corresponding to temporally sequenced content of the second media data object that falls outside the set of common temporal subsequences between the first media data object and the second media data object based at least in part on the set of edits. Thus, changed content may be targeted for a workflow where unchanged content may not be targeted for a workflow.

In some examples, the workflow may include automated computer-executed processes—e.g., applying effects to changed video, performing an audio mixing for changed audio content, etc. In some examples, the workflow may include preparing one or more users and/or teams with content useful for completing a task associated with the set of edits (e.g., data resources and/or directory structures associated with visual effects if a new scene has been inserted).

In some examples, the workflow may include a version control function. For example, by tokenizing the content of the media data objects (in terms of common and different contiguous subsequences between the media data objects), updated versions of a media asset may be represented in terms of changes applied to the media asset. Where two different teams make simultaneous modifications to a master media asset, the systems described herein may merge the identified changes from the two updated versions of the asset.

Figure 3:
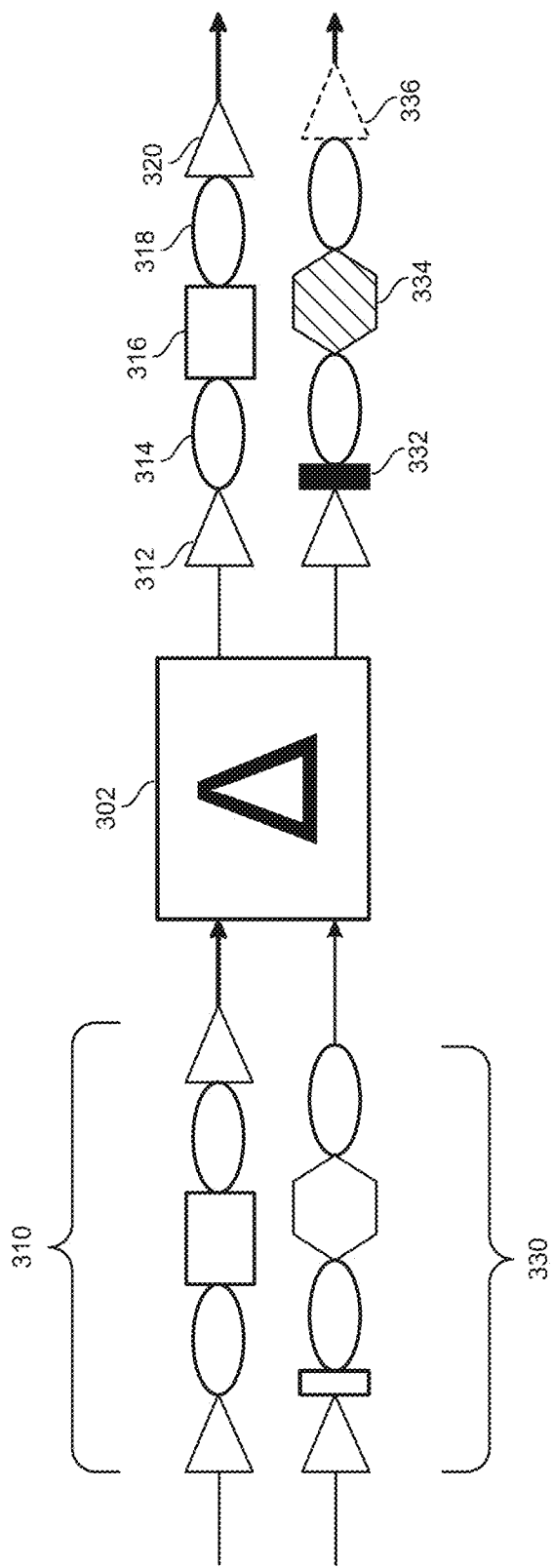
FIG. 3 is an illustration of two exemplary media assets processed such that a set of edits between the assets are identified.

FIG. 3 is an illustration of two exemplary media assets processed such that a set of edits between the assets are identified. As shown in FIG. 3, a string 310 represents tokenized content of a first media data object and a string 330 represents tokenized content of a second media data object. Each token represents a contiguous subsequence of temporal content segments. A subsystem 302 analyzes strings 310 and 330 to determine a set of edits that describes the difference between strings 310 and 330. Thus, string 310, having tokens 312, 314, 316, 318, and 320, is modified with an insertion of a token 332, a substitution of a token 316 with a token 334, and a deletion 336 of token 320.

Figure 4B:
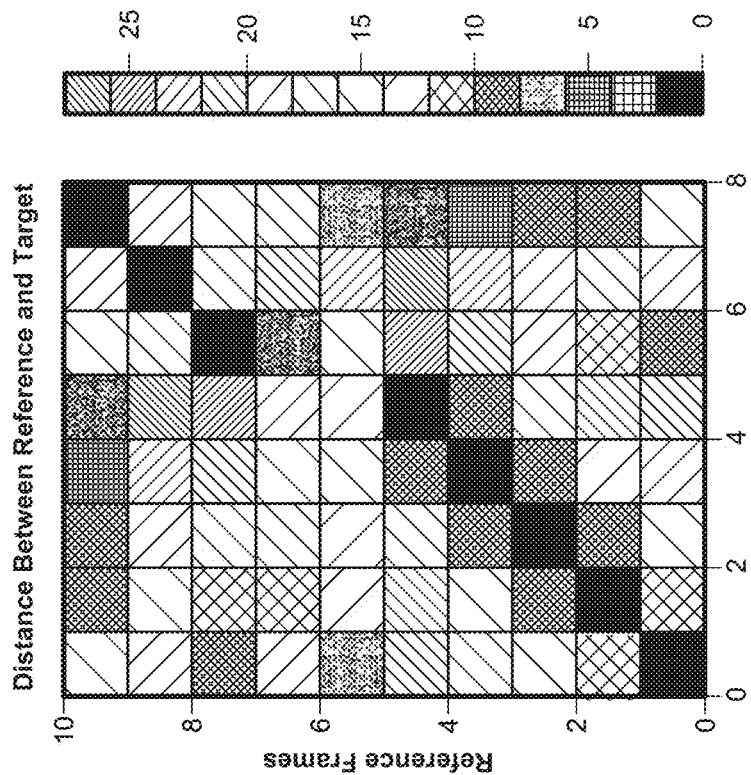
FIG. 4B is an illustration of the distances between the respective temporally ordered segments of two media signals, where a reference signal has been altered to produce the target signal.
Figure 4A:
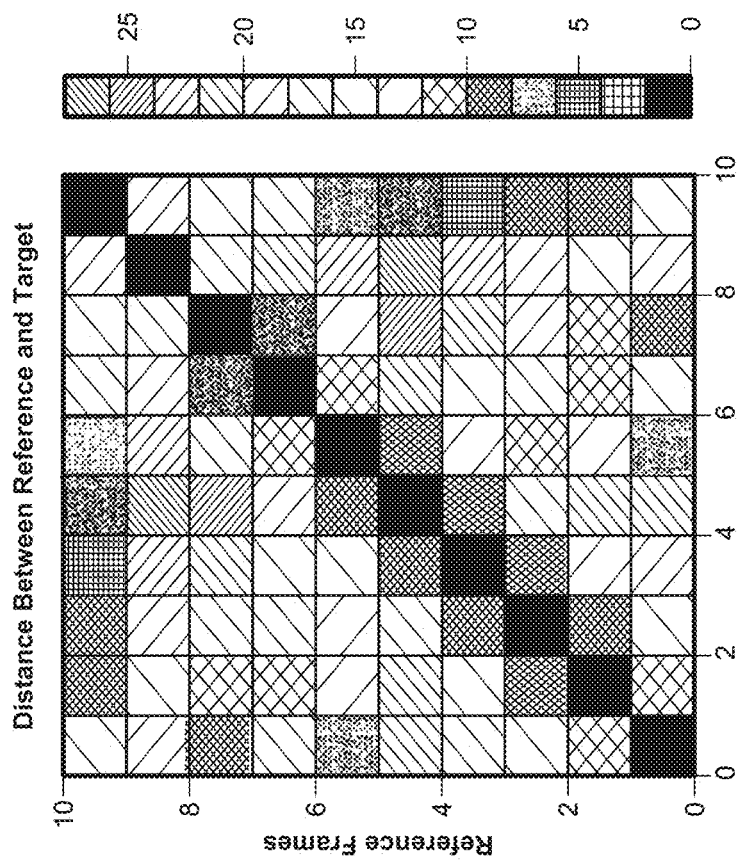
FIG. 4A is an illustration of the distances between the respective temporally ordered segments of two media signals that are the same.

FIG. 4A is an illustration of the distances between the respective temporally ordered segments of two media signals that are the same. FIG. 4B is an illustration of the distances between the respective temporally ordered segments of two media signals, where a reference signal has been altered to produce the target signal. Each square in the matrices represents a pairwise comparison (e.g., using a distance function as described earlier) between a video frame from a reference video signal and a video frame from a target video signal. Solid black squares represent a match—the two frames in the compared pair being substantially the same. As used herein, the terms "reference" and "target" may be used interchangeably with the terms "first" and "second," respectively; where "reference" or "first" may indicate an earlier version of a media file, content, and/or signal and "target" or "second" may indicate a later version and/or a derivative of the media file, content, and/or signal.

Figure 5A:
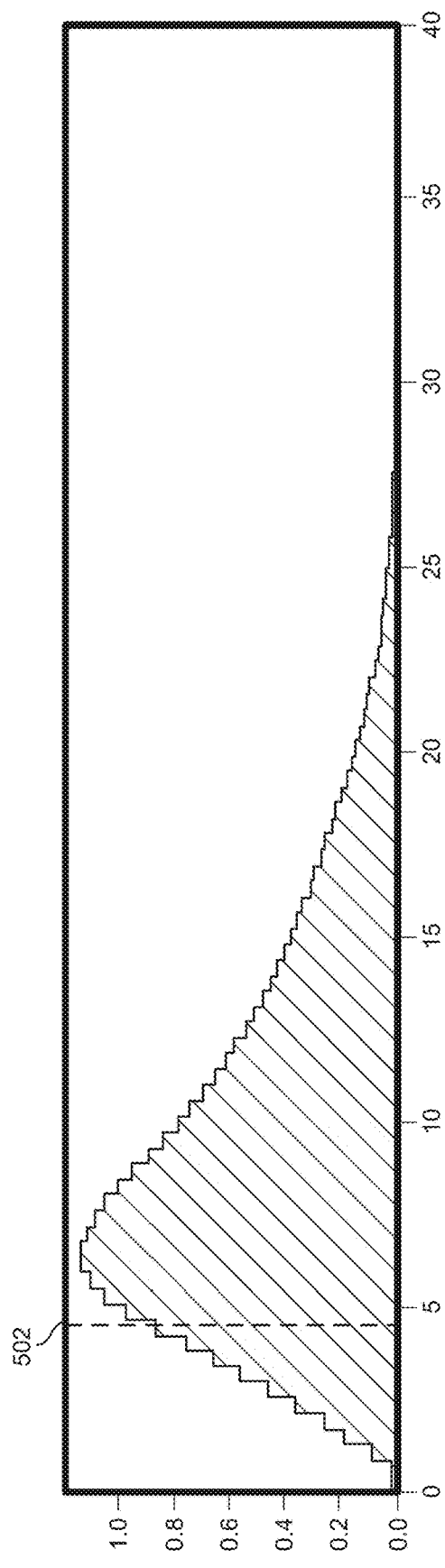
FIG. 5A is a histogram of calculated differences between media segments that are considered different from each other.
Figure 5B:
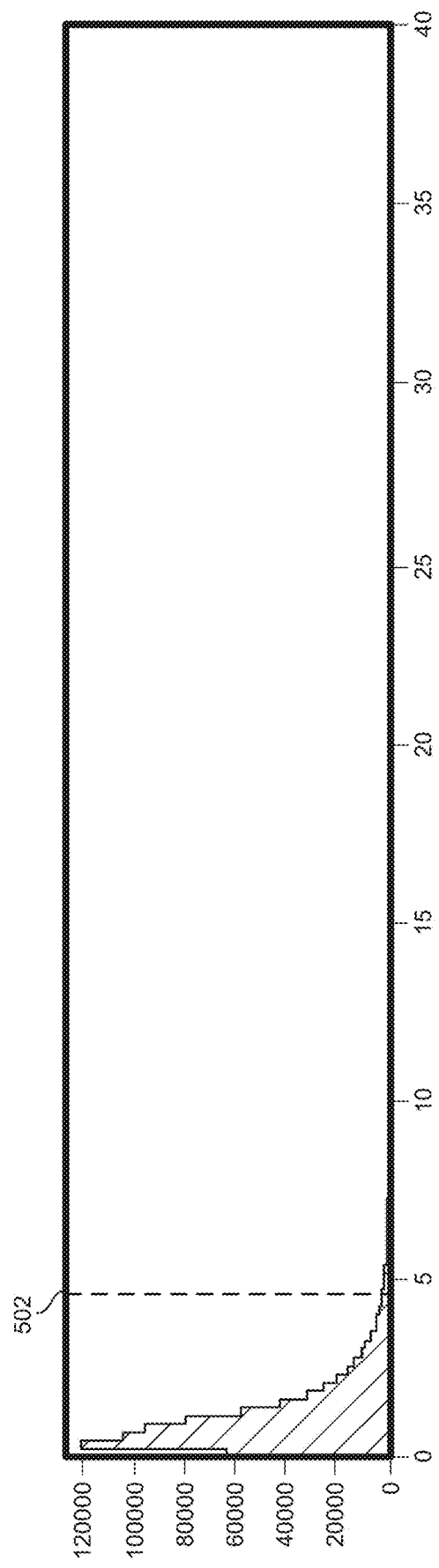
FIG. 5B is a histogram of calculated differences between media segments that are considered the same as each other.

FIG. 5A is a histogram of calculated differences between media segments that are considered different from each other. FIG. 5B is a histogram of calculated differences between media segments that are considered the same as each other. When a threshold 502 is selected, very few media segments that are considered (e.g., to human judgment) the same as each other are classified by a comparison process as different from each other. In some examples the systems described herein may use a threshold that leads to more false positives of sameness (e.g., those segment pairs to the left of threshold 502 in FIG. 5A) than to false negatives of sameness (e.g., those segment pairs to the right of threshold 502 in FIG. 5B). Favoring false positives over false negatives may lead to a more accurate identification of the longest common subsequence, at least in part because a false negative is unlikely to cause a different longest common subsequence to be identified.

Figure 6B:
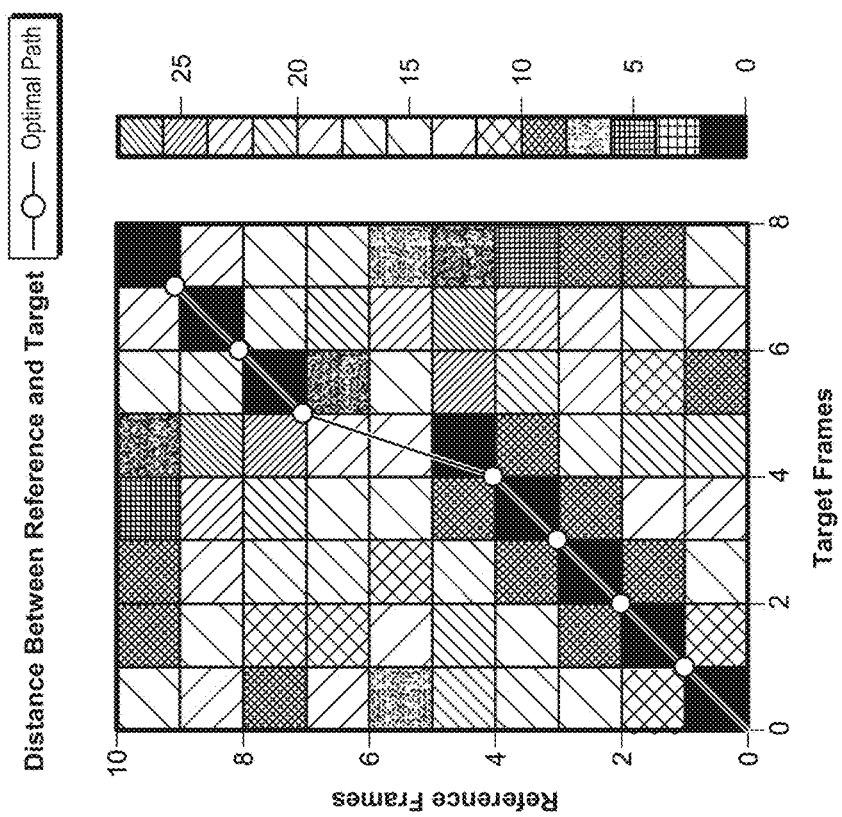
FIG. 6B is an illustration of the longest common subsequence identified within the pair of media signals of FIG. 4B.
Figure 6A:
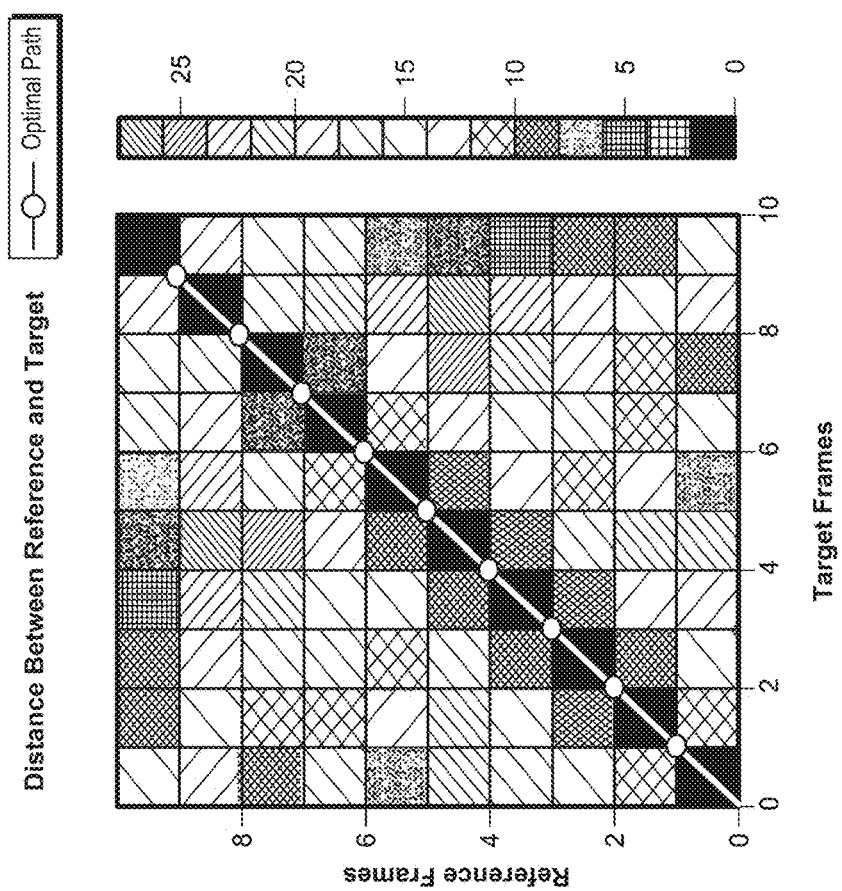
FIG. 6A is an illustration of the longest common subsequence identified within the pair of media signals of FIG. 4A.

FIG. 6A is an illustration of the longest common subsequence identified within the pair of media signals of FIG. 4A. FIG. 6B is an illustration of the longest common subsequence identified within the pair of media signals of FIG. 4B. As shown in FIG. 6A, a diagonal of black squares indicates an unbroken longest common subsequence (because the reference and target signals are the same). However, in FIG. 6B, two frames have been removed from the target signal (what were originally the sixth and seventh frames), resulting in a discontinuity. The longest common subsequence is therefore frames 1-5 and 8-10 from the reference video signal. As described earlier, once the longest common subsequence is identified, contiguous subsequences may be tokenized and used to determine a set of edits describing the differences between the two signals. For example, the reference video signal in FIG. 6B could be represented by the string "ABC", where the token "A" represents frames 1-5, the token "B" represents frames 6-7, and the token "C" represents frames 8-10. The target video signal could be represented, therefore, by the string "AC", where the token "A" corresponds to frames 1-5 and the token "C" corresponds to frames 6-8. The edit distance between the strings "ABC" and "AC" is 1, the corresponding edit being the deletion of "B". Thus, the set of edits is the deletion of "B".

Figure 7:
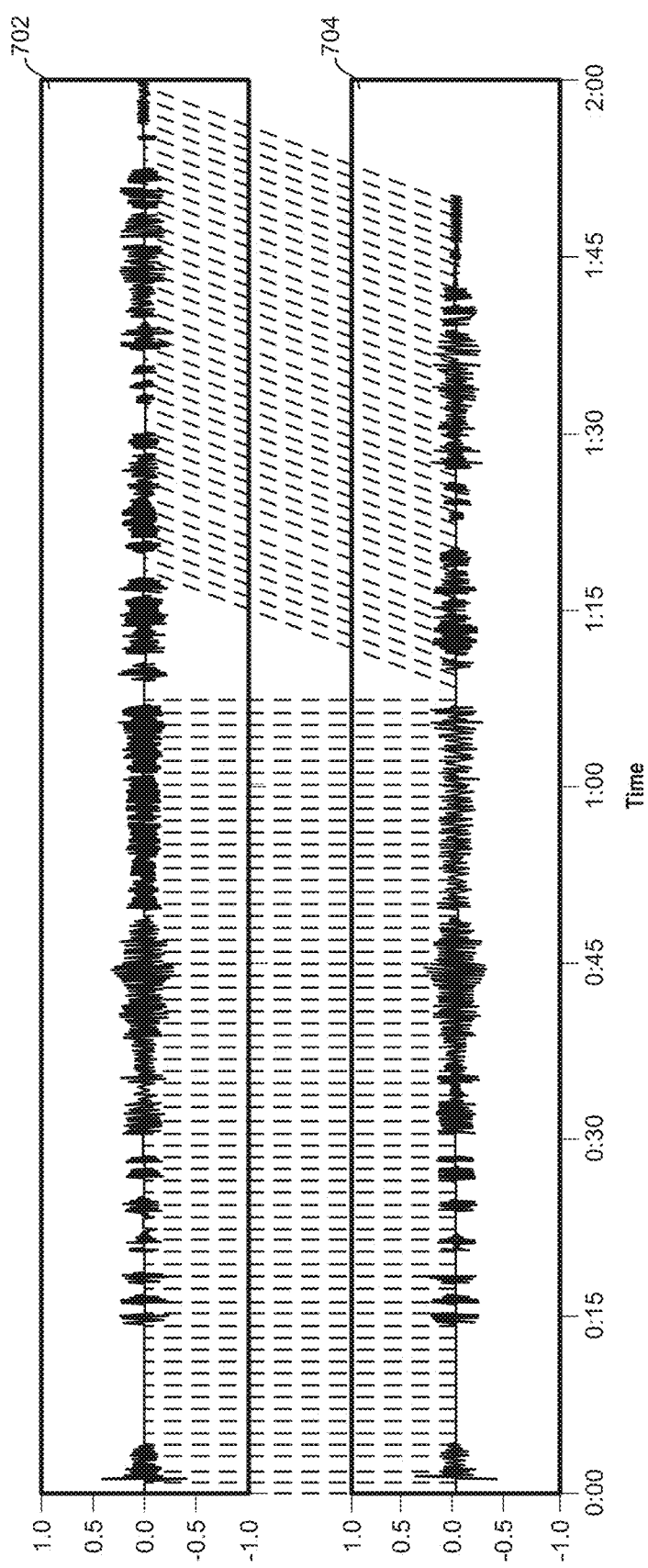
FIG. 7 is an illustration of a reference audio signal edited to remove a segment, resulting in a target audio signal.
Figures 8A, 8B:
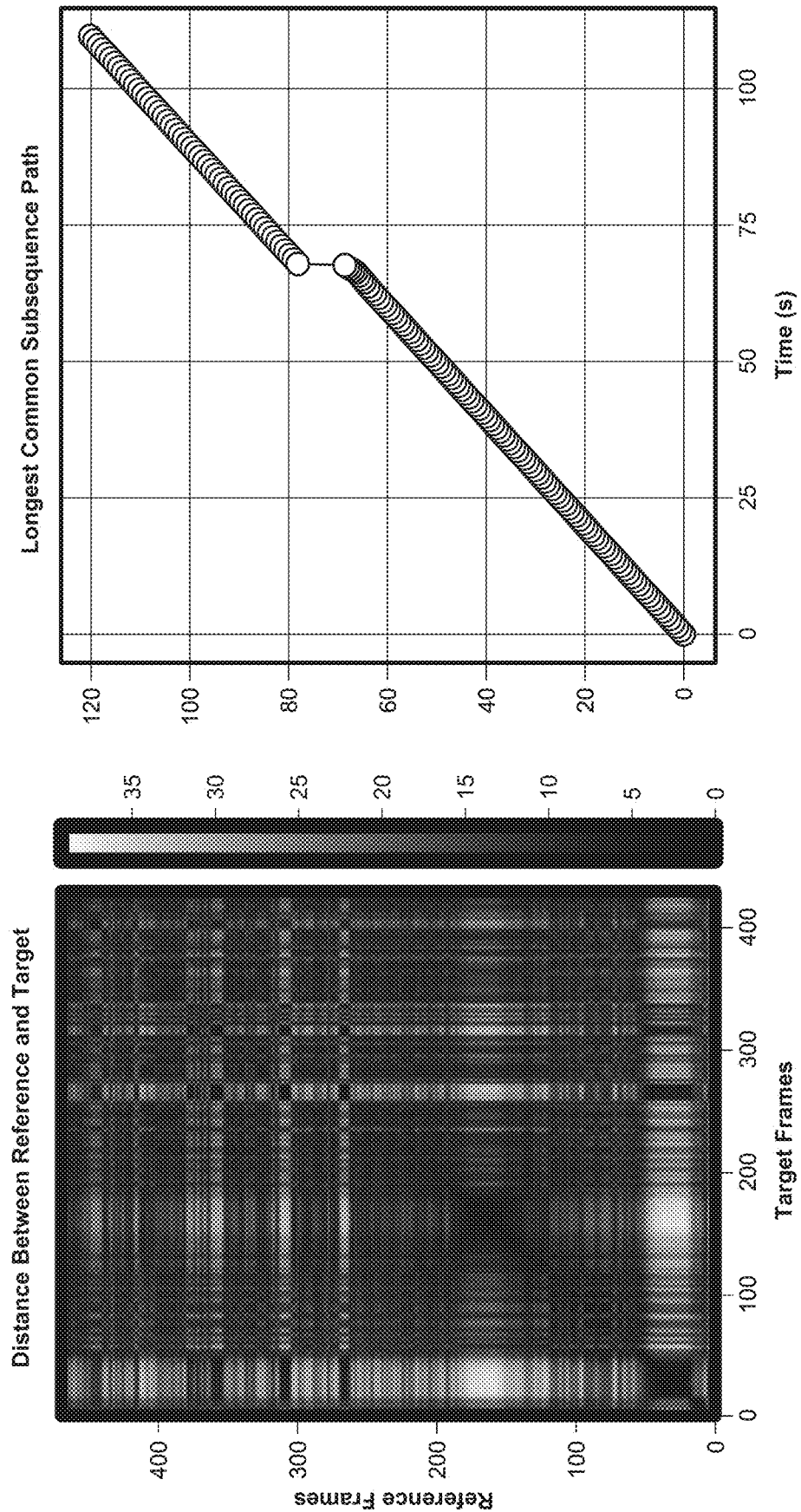
FIG. 8A is an illustration of the distances between the respective temporally ordered segments of the two audio signals of FIG. 7.
FIG. 8B is an illustration of the longest common subsequence identified within the pair of audio signals of FIG. 7.

FIG. 7 is an illustration of a reference audio signal 702 edited to remove a segment, resulting in a target audio signal 704. For example, a portion starting at 1:08 and ending at 1:18 is removed from the reference audio signal 702 to produce the target audio signal 704. FIG. 8A is an illustration of the distances between the respective temporally ordered segments of the two audio signals of FIG. 7. Similar to how FIG. 6B illustrates a path showing the longest common subsequence from FIG. 4B, FIG. 8B is an illustration of the longest common subsequence from FIG. 8A, as derived from the pair of audio signals of FIG. 7. The diagonal lines of FIG. 8 represent the two contiguous common subsequences between the reference and target signals. The vertical line in FIG. 8B represents the deletion from the reference signal 702.

Figure 9:
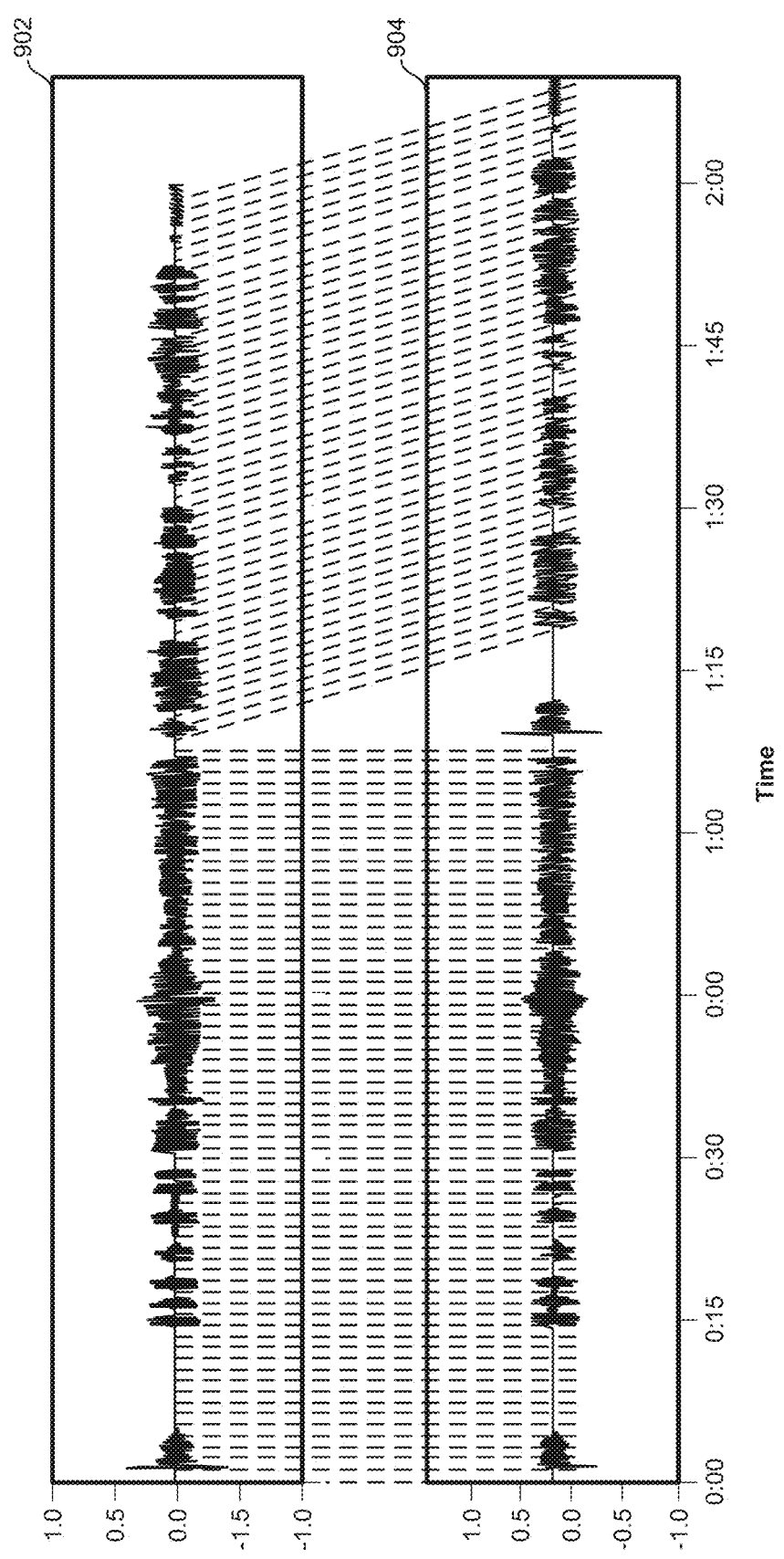
FIG. 9 is an illustration of a reference audio signal edited to add a segment, resulting in a target audio signal.
Figures 10A, 10B:
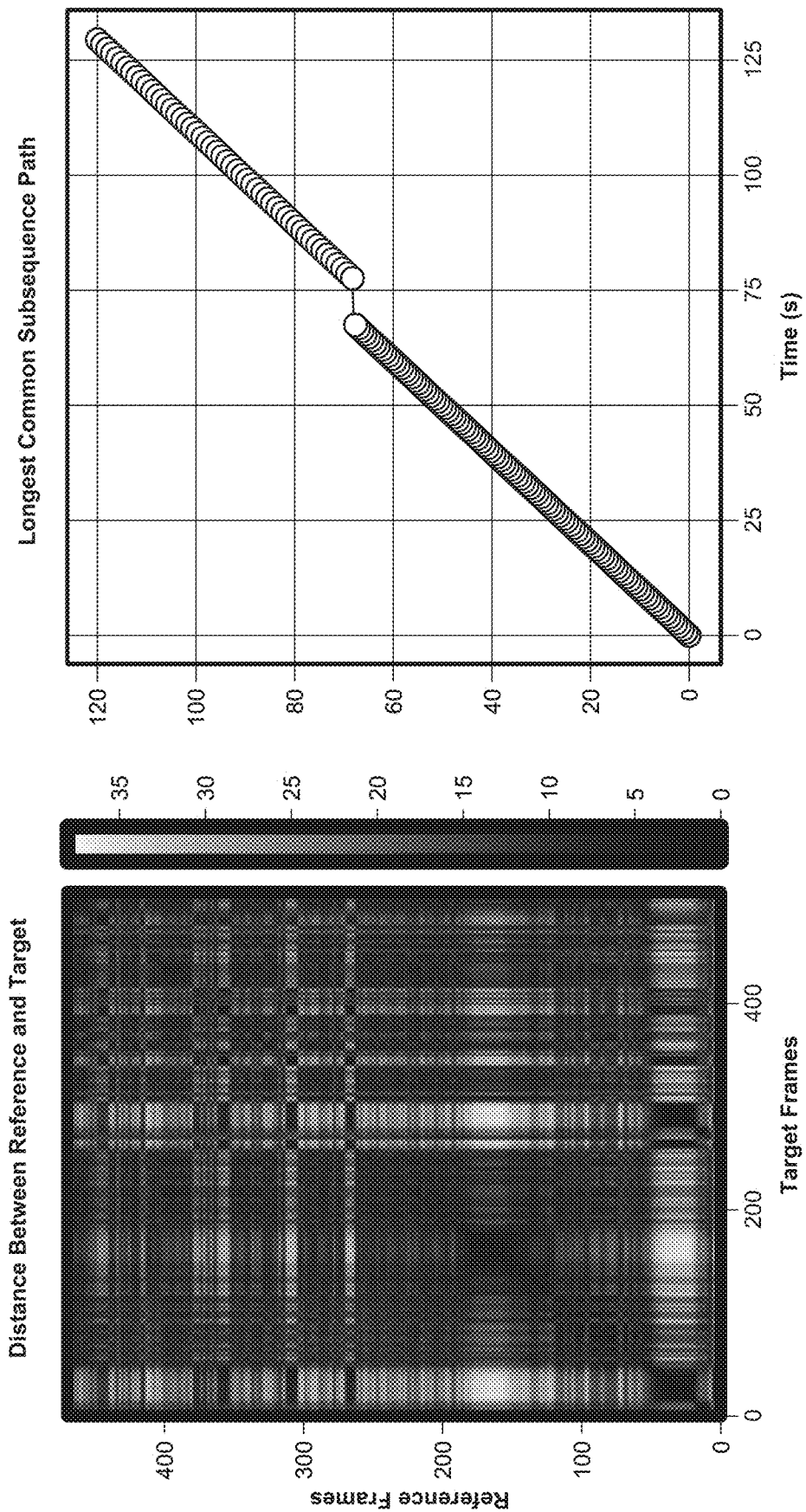
FIG. 10A is an illustration of the distances between the respective temporally ordered segments of the two audio signals of FIG. 9.

FIG. 9 is an illustration of a reference audio signal 902 edited to add a segment, resulting in a target audio signal 904. For example, a 10-second-long portion is inserted into the reference signal 902 at 1:08 to produce the target signal 904. FIG. 10A is an illustration of the distances between the respective temporally ordered segments of the two audio signals of FIG. 9. FIG. 10B is an illustration of the longest common subsequence identified within the pair of audio signals of FIG. 9. The horizontal line in FIG. 10B represents the insertion into the reference signal 902.

Figure 11:
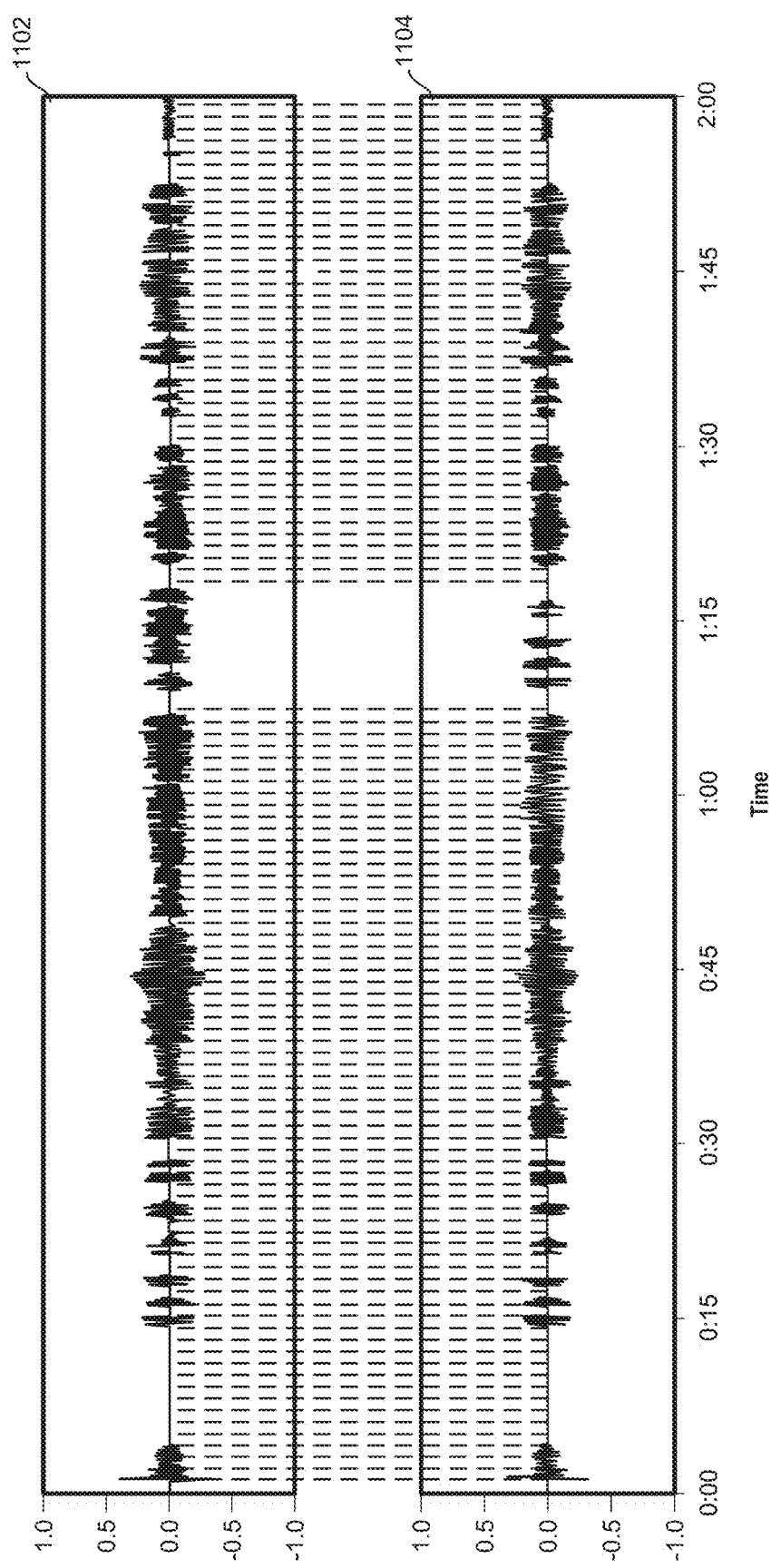
FIG. 11 is an illustration of a reference audio signal edited to replace a segment, resulting in a target audio signal.
Figures 12A, 12B:
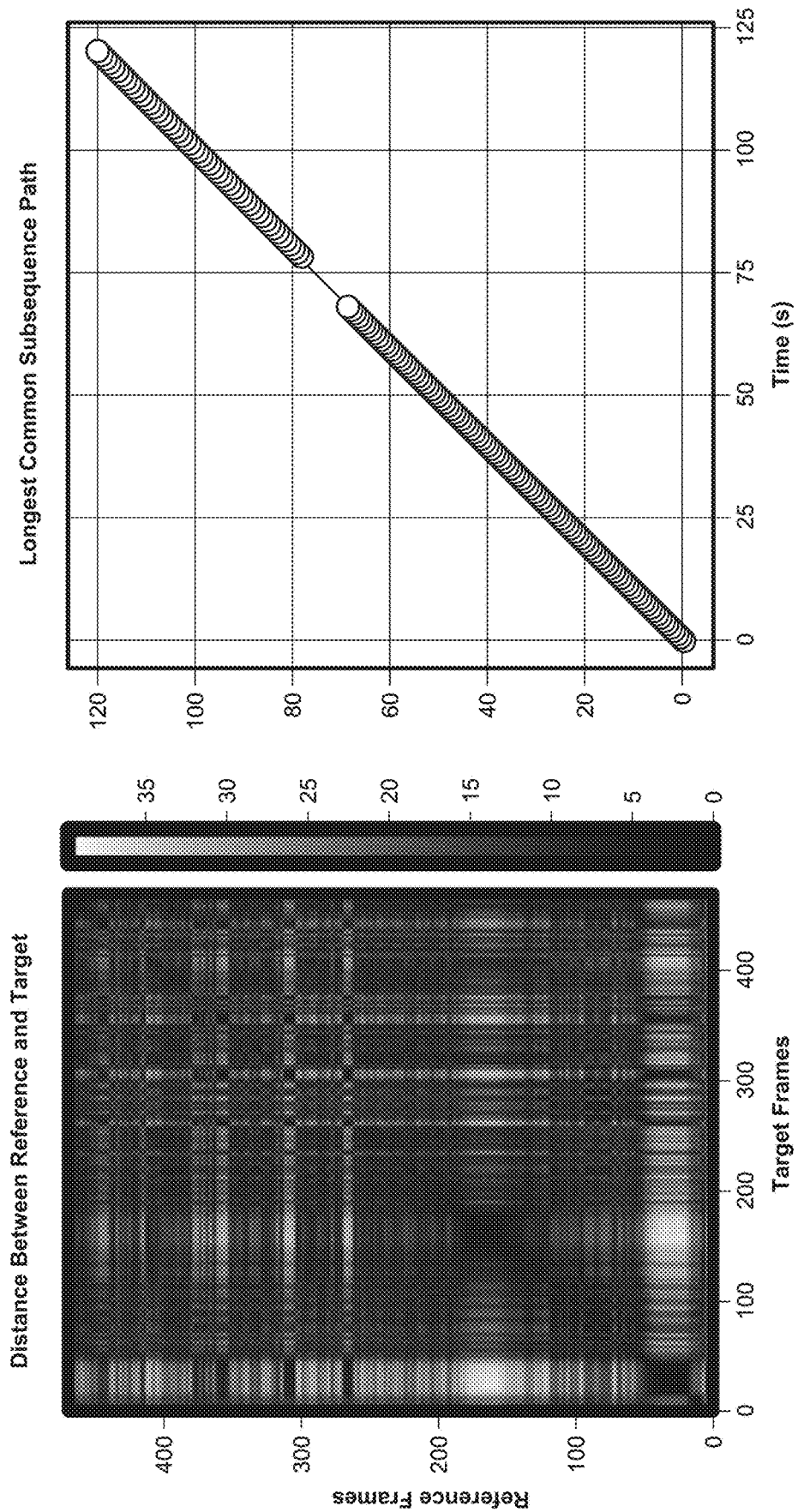
FIG. 12A is an illustration of the distances between the respective temporally ordered segments of the two audio signals of FIG. 11.

FIG. 11 is an illustration of a reference audio signal 1102 edited to replace a segment, resulting in a target audio signal 1104. For example, a 10-second-long portion from 1:08 to 1:18 is replaced. FIG. 12A is an illustration of the distances between the respective temporally ordered segments of the two audio signals of FIG. 11. FIG. 12B is an illustration of the longest common subsequence identified within the pair of audio signals of FIG. 11. The thin diagonal connecting the two thick diagonals represents the substitution of the portion of the reference signal 1102.

Figure 13:
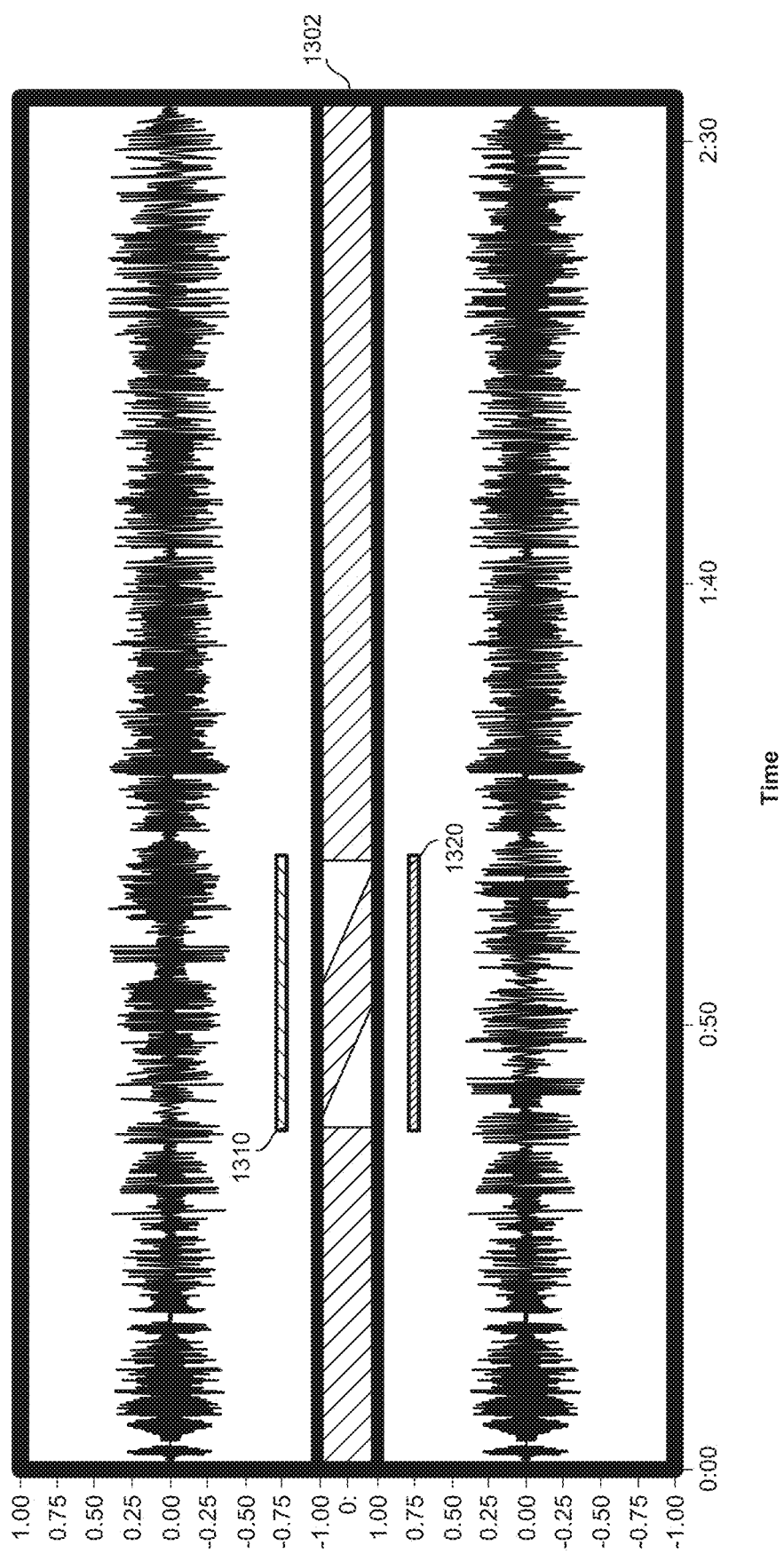
FIG. 13 is an illustration of a reference audio signal edited to swap two adjacent segments, resulting in a target audio signal.

FIG. 13 is an illustration of a reference audio signal edited to swap two adjacent segments, resulting in a target audio signal. As shown in FIG. 13, bar 1302 shows which portions of the reference signal match which portions of the target signal. Bar 1310 shows the interval within which the swap edit occurs. Bar 1320 shows where the systems described herein identify a swap edit.

Figure 14:
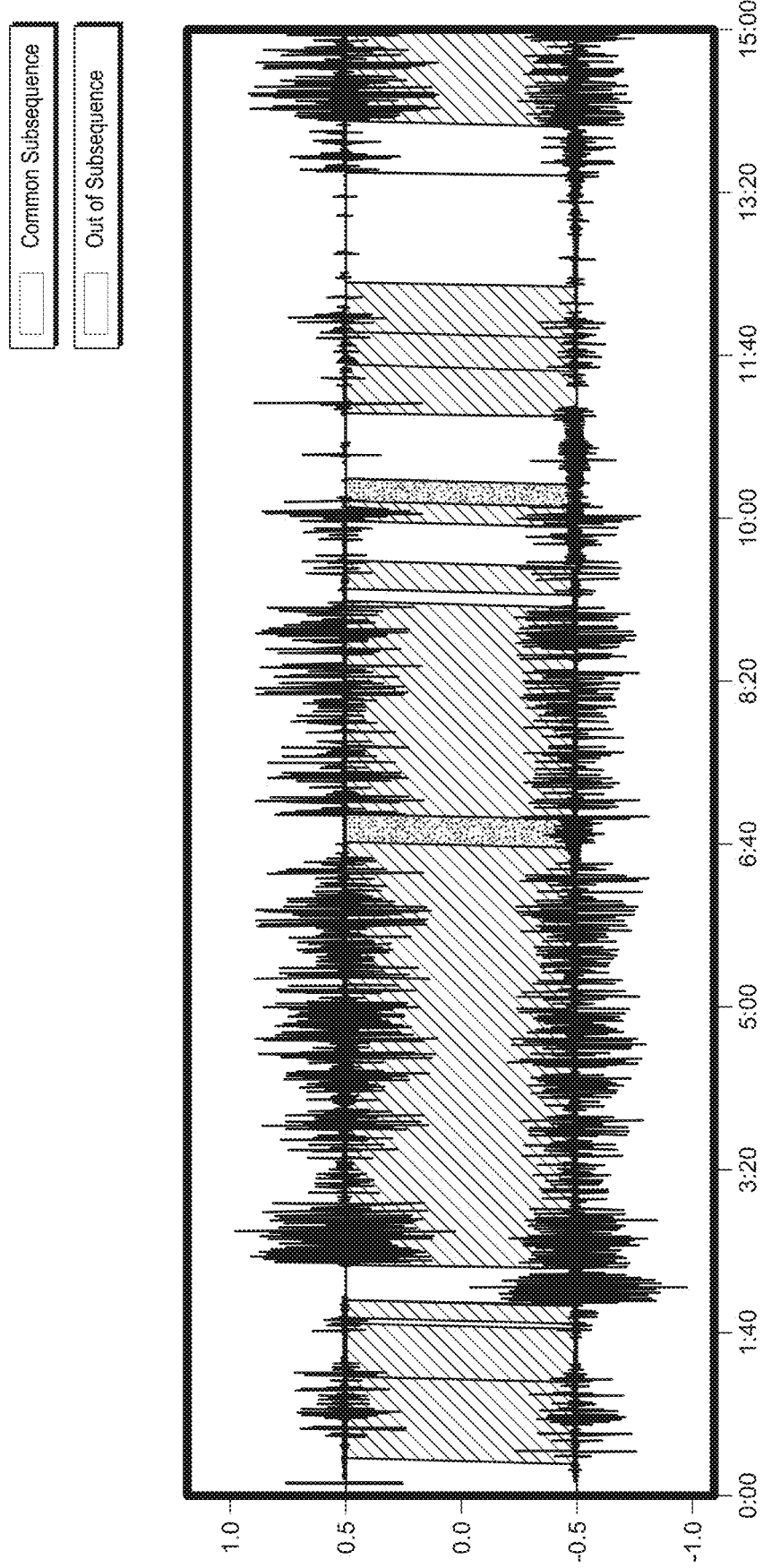
FIG. 14 is an illustration of segments of a pair of audio signals that are part of a longest common subsequence and that are not part of a longest common subsequence.

FIG. 14 is an illustration of segments of a pair of audio signals that are part of a longest common subsequence and that are not part of a longest common subsequence. As shown in FIG. 14, the set of edits includes several substitutions that fall outside of the longest common subsequence ("Out of Subsequence").

Figure 15:
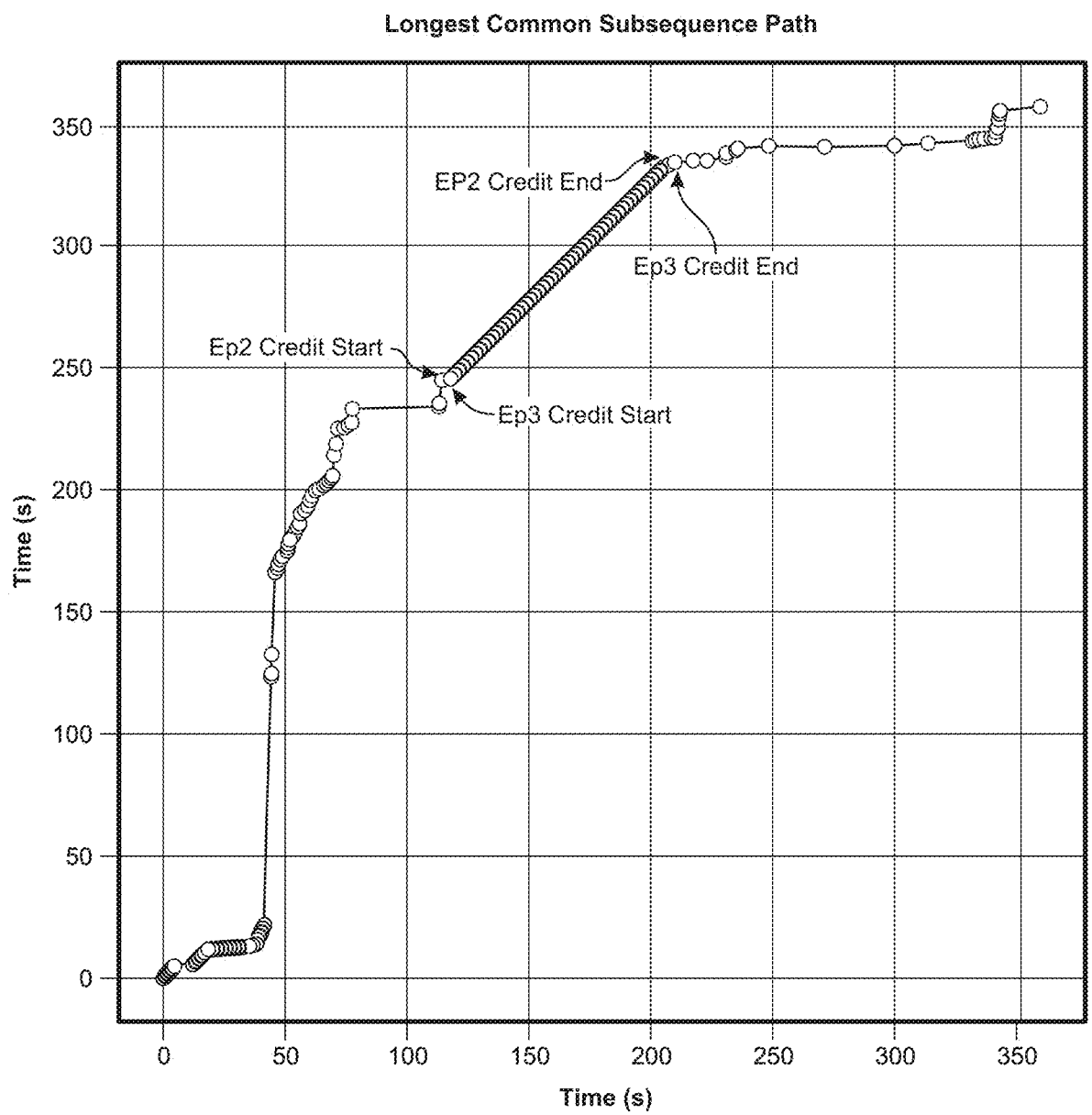
FIG. 15 is an illustration of identifying where credit sequences start and end in two respective episodes of a show series.

FIG. 15 is an illustration of identifying where credit sequences start and end in two respective episodes of a show series. As shown in FIG. 15, the credit sequences start at different times in the two respective episodes. However, because they are the only significant content overlap between the two episodes, they represent the longest contiguous common subsequence (appearing in FIG. 15 as a long diagonal line). Systems described herein may therefore use the techniques described herein to identify credit sequences in episodes and mark them accordingly (e.g., to assist post-production teams to focus resources and/or to perform automated tasks such as adding a "skip credits" functionality to apply to the correct time window. Systems described herein may apply the techniques described herein to video signals and/or to audio signals to identify credit sequences.

Figure 16:
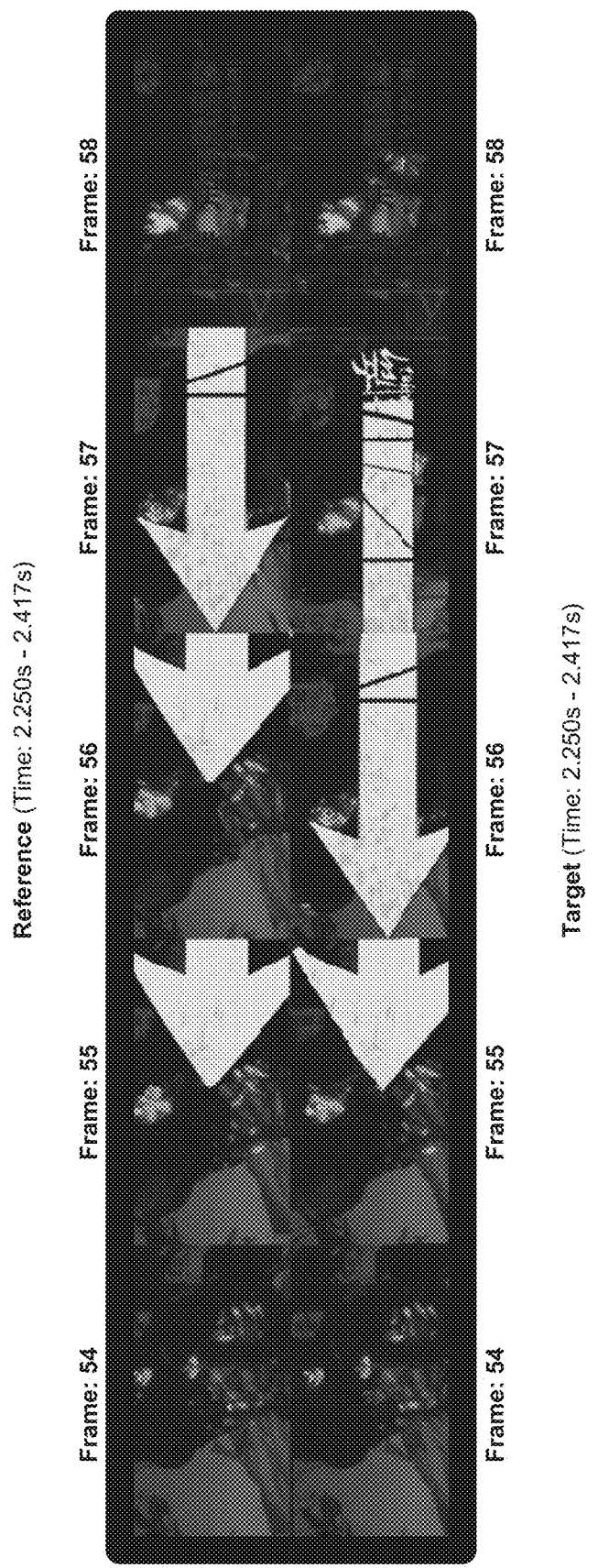
FIG. 16 is an illustration of a reference video signal edited to remove a frame and to add a frame, resulting in a target video signal.

FIG. 16 is an illustration of a reference video signal edited to remove a frame and to add a frame, resulting in a target video signal. For example, as shown in FIG. 16, frame 55 has been removed from the reference video signal, frames 56 and 57 from the reference video signal have been shifted to frames 55 and 56 of the target video signal, and frame 57 represents an insertion to the target video signal. Thus, the longest common subsequence is (in terms of the reference signal) frames 54-56-57-58 (in terms of the target signal it is frames 54-55-56-58, because frames 56 and 57 of the reference signal correspond to frames 55 and 56 of the target signal).

Figure 17:
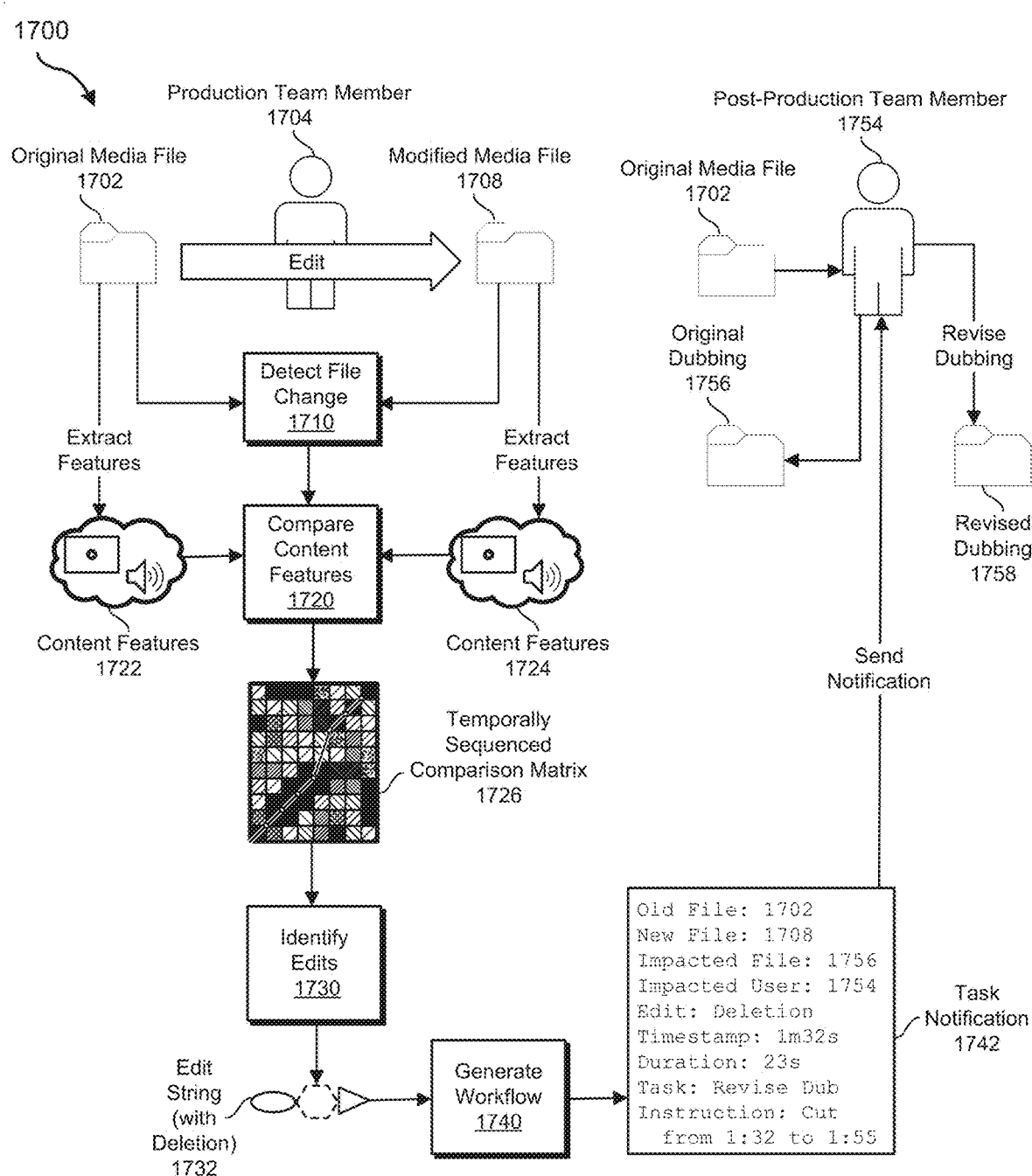
FIG. 17 is an illustration of an exemplary process including production and post-production.

FIG. 17 illustrates an example of systems and methods described herein applied to coordinate between production and post-production processes. As shown in FIG. 17, a production team member 1704 may apply edits to an original media file 1702, resulting in a modified media file 1708. At 1710, systems described herein may detect the change applied to original media file 1702. Accordingly, these systems may extract content features from original media file 1702 and modified media file 1708, resulting in content features 1722 and 1724, respectively. These systems may compare content features 1722 and 1724, producing, e.g., a temporally sequenced comparison matrix 1726. Using matrix 1726, at 1730 these systems may identify a set of edits that describe the difference between content features 1722 and content features 1724. The set of edits may be represented as an edit string 1732 that shows that a portion of temporally sequenced content was deleted from original media file 1702 to result in modified media file 1708. Based on edit string 1732, at 1740 systems described herein may generate a workflow. For example, these systems may generate and send a task notification 1742. Task notification 1742 may include, be based on, and/or indicate any of a variety of information, including, e.g., identifying the file 1702 as having changes applied and identifying the file 1708 as being the results of the changes. Because a post-production team member 1754 produced an original dubbing 1756 for original media file 1702, the task notification 1742 may be directed to and/or may identify post-production team member 1754 and original dubbing 1756 as being impacted by the edit. Task notification 1742 may also include information about the edit (including the type of edit, timestamps describing the location of the edit, a suggested task needed in response to the edit, and/or additional detailed information and/or instructions about how to perform the task based on the edit information. The systems described herein may then send task notification 1742 to post-production team member 1754, who may, using information in task notification, revise the dubbing to reflect modified media file 1708, resulting in revised dubbing 1758.

Figure 18:
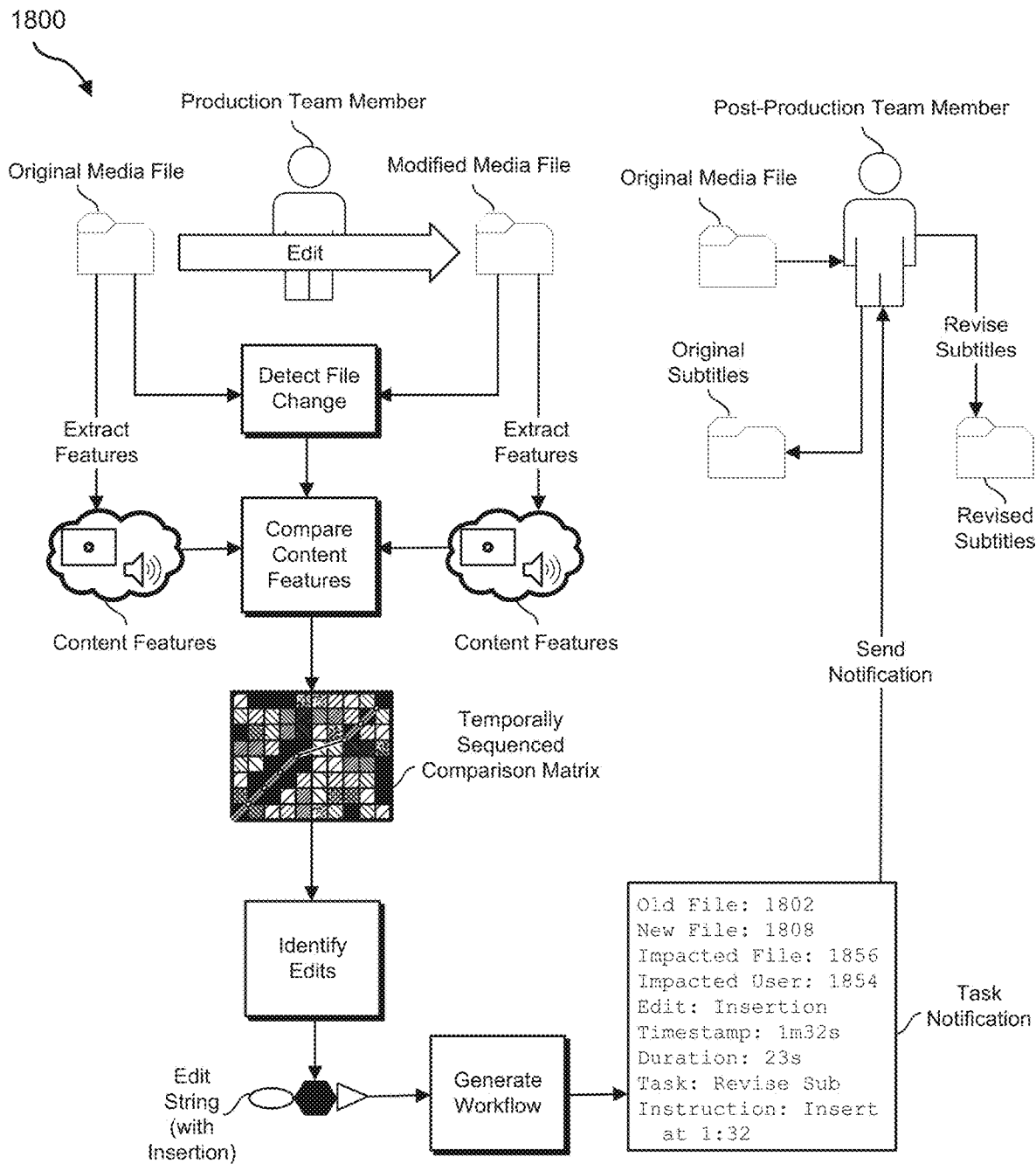
FIG. 18 is an illustration of an exemplary process including production and post-production.

FIG. 18 illustrates another example of systems and methods described herein being applied to coordinate between production and post-production processes. As shown in FIG. 18, systems described herein may identify an insertion performed by a production team member that impacts the task of subtitling being performed by a post-production team member. The post-production team member may, using a task notification generated, directed, and transmitted by the systems described herein, revise the subtitles.

Figure 19:
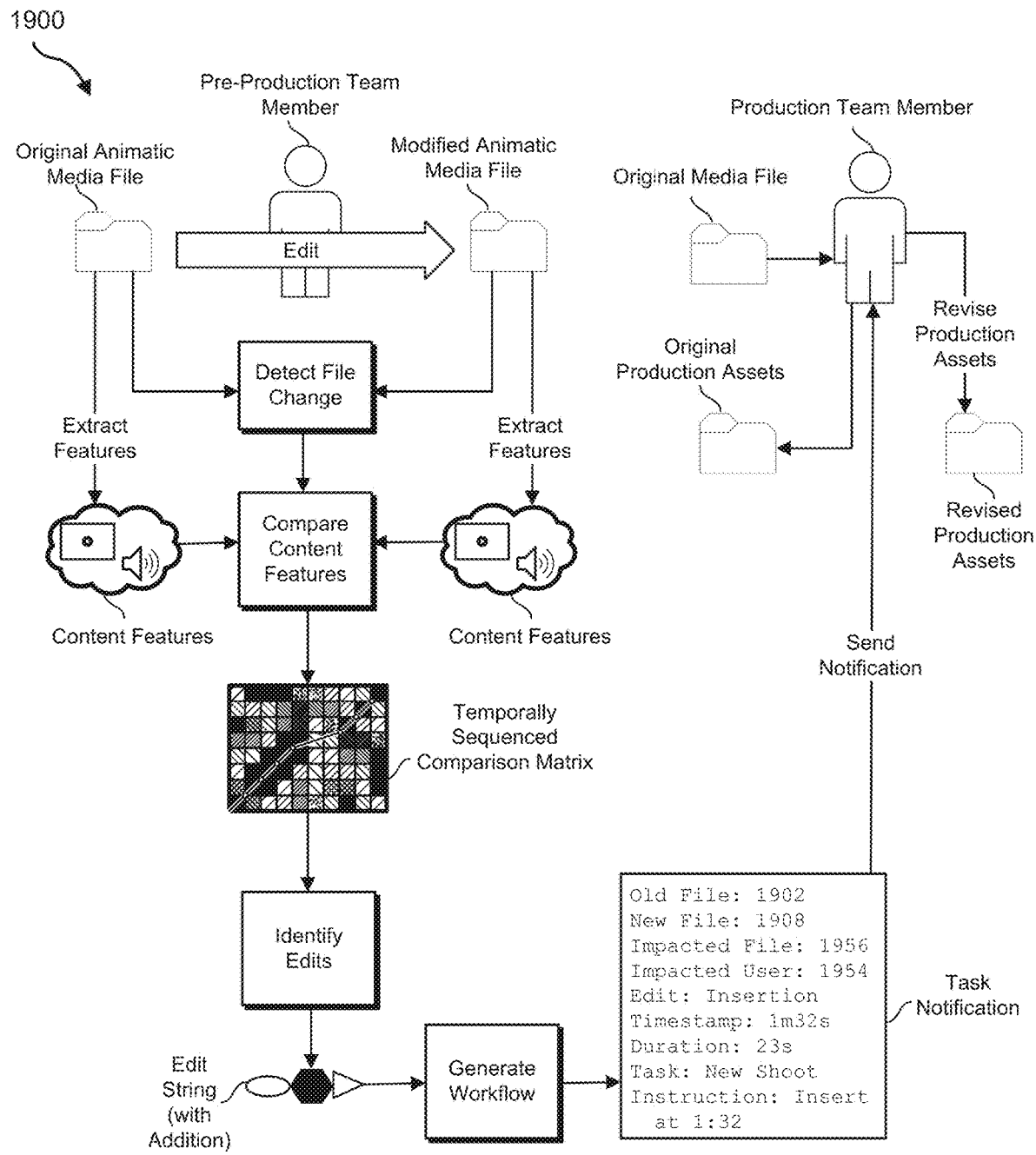
FIG. 19 is an illustration of an exemplary process including pre-production and production.

FIG. 19 illustrates another example of systems and methods described herein being applied to coordinate between pre-production and production processes. As shown in FIG. 19, systems described herein may identify an insertion made by a pre-production team member to an animatic. A production team member may therefore work on creating new production assets to correspond to the insertion made by the pre-production team member.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive media data objects to be transformed, transform the media data objects, output a result of the transformation to identify changes to the media data objects, use the result of the transformation to execute a workflow, and store the result of the transformation to record the workflow. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    accessing a first media data object and a different, second media data object that, when played back, each render temporally sequenced content;
    comparing first temporally sequenced content represented by the first media data object with second temporally sequenced content represented by the second media data object to identify a set of common temporal subsequences between the first media data object and the second media data object;
    identifying, based on the set of common temporal subsequences, at least one difference between the first media data object and the second media data object; and
    updating, based on the difference, a set of project tasks associated with at least one of the first media data object and the second media data object.

2. The computer-implemented method of claim 1, wherein:
    identifying the difference comprises identifying a subsequence inserted between subsequences within the set of common temporal subsequences;
    the set of project tasks comprises an active task for localizing the subsequences; and
    updating the set of project tasks comprises updating the active task to include instructions for localizing the subsequence.

3. The computer-implemented method of claim 1, wherein:
    identifying the difference comprises identifying a subsequence removed from at least one of the first media data object and the second media data object;
    the set of project tasks comprises an active task for localizing the subsequence; and
    updating the set of project tasks comprises deactivating the task for localizing the subsequence.

4. The computer-implemented method of claim 1, wherein:
    the first media data object and the second media data object are animatics;
    identifying the difference comprises identifying a new animatic subsequence inserted adjacent to a prior animatic subsequence within the set of common temporal subsequences; and
    updating the set of project tasks comprises generating a task for generating a production asset from the new animatic subsequence.

5. The computer-implemented method of claim 1, wherein:
    the first media data object and the second media data object are animatics;
    identifying the difference comprises identifying an animatic subsequence removed from at least one of the first media data object and the second media data object;

the set of project tasks comprises an active task for generating a production asset from the animatic subsequence; and updating the set of project tasks comprises deactivating the task for generating the production asset from the animatic subsequence.

6. The computer-implemented method of claim 1, wherein:

identifying the difference comprises identifying a subsequence inserted adjacent to a subsequence within the set of common temporal subsequences; and updating the set of project tasks comprises generating a task for checking continuity between the inserted subsequence and the subsequence within the set of common temporal subsequences.

7. The computer-implemented method of claim 1, wherein:

identifying the difference comprises identifying a subsequence removed from between two subsequences within the set of common temporal subsequences; and updating the set of project tasks comprises generating a task for checking continuity between the two subsequences within the set of common temporal subsequences.

8. The computer-implemented method of claim 1, wherein:

identifying the difference comprises identifying a different order of two adjacent subsequences within the set of common temporal subsequences; and updating the set of project tasks comprises generating a task for checking continuity between the two subsequences within the set of common temporal subsequences.

9. The computer-implemented method of claim 1, wherein:

the first media data object is designated as a master media asset;

the second media data object is designated as a clone of the master media asset; and updating the set of project tasks comprises generating a task for merging the first media data object and the second media data object into a new master media asset.

10. The computer-implemented method of claim 1, wherein the first and second media data objects comprise video data objects.

11. A system comprising:

at least one physical processor; and physical memory comprising computer-executable instructions that, when executed by the physical processor, cause the physical processor to:

access a first media data object and a different, second media data object that, when played back, each render temporally sequenced content;

compare first temporally sequenced content represented by the first media data object with second temporally sequenced content represented by the second media data object to identify a set of common temporal subsequences between the first media data object and the second media data object;

identify, based on the set of common temporal subsequences, at least one difference between the first media data object and the second media data object; and update, based on the difference, a set of project tasks associated with at least one of the first media data object and the second media data object.

12. The system of claim 11, wherein:

identifying the difference comprises identifying a subsequence inserted between subsequences within the set of common temporal subsequences;

the set of project tasks comprises an active task for localizing the subsequences; and updating the set of project tasks comprises updating the active task to include instructions for localizing the subsequence.

13. The system of claim 11, wherein:

identifying the difference comprises identifying a subsequence removed from at least one of the first media data object and the second media data object;

the set of project tasks comprises an active task for localizing the subsequence; and updating the set of project tasks comprises deactivating the task for localizing the subsequence.

14. The system of claim 11, wherein:

the first media data object and the second media data object are animatics;

identifying the difference comprises identifying a new animatic subsequence inserted adjacent to a prior animatic subsequence within the set of common temporal subsequences; and updating the set of project tasks comprises generating a task for generating a production asset from the new animatic subsequence.

15. The system of claim 11, wherein:

the first media data object and the second media data object are animatics;

identifying the difference comprises identifying an animatic subsequence removed from at least one of the first media data object and the second media data object;

the set of project tasks comprises an active task for generating a production asset from the animatic subsequence; and updating the set of project tasks comprises deactivating the task for generating the production asset from the animatic subsequence.

16. The system of claim 11, wherein:

identifying the difference comprises identifying a subsequence inserted adjacent to a subsequence within the set of common temporal subsequences; and updating the set of project tasks comprises generating a task for checking continuity between the inserted subsequence and the subsequence within the set of common temporal subsequences.

17. The system of claim 11, wherein:

identifying the difference comprises identifying a subsequence removed from between two subsequences within the set of common temporal subsequences; and updating the set of project tasks comprises generating a task for checking continuity between the two subsequences within the set of common temporal subsequences.

18. The system of claim 11, wherein:

identifying the difference comprises identifying a different order of two adjacent subsequences within the set of common temporal subsequences; and updating the set of project tasks comprises generating a task for checking continuity between the two subsequences within the set of common temporal subsequences.

19. The system of claim 11, wherein:

the first media data object is designated as a master media asset;

the second media data object is designated as a clone of the master media asset; and updating the set of project tasks comprises generating a task for merging the first media data object and the second media data object into a new master media asset.

20. A non-transitory computer-readable medium comprising one or more computer-executable instructions that, when executed by at least one processor of a computing device, cause the computing device to:

access a first media data object and a different, second media data object that, when played back, each render temporally sequenced content;

compare first temporally sequenced content represented by the first media data object with second temporally sequenced content represented by the second media data object to identify a set of common temporal subsequences between the first media data object and the second media data object;

identify, based on the set of common temporal subsequences, at least one difference between the first media data object and the second media data object; and update, based on the difference, a set of project tasks associated with at least one of the first media data object and the second media data object.

* * * * *